(12) United States Patent
Heckeroth

(10) Patent No.: US 10,893,642 B2
(45) Date of Patent: Jan. 19, 2021

(54) AGRICULTURAL VEHICLE WITH BIDIRECTIONAL FORCE EXERTING ELECTRIC THREE-POINT HITCH ASSEMBLIES

(71) Applicant: Stephen Heckeroth, Albion, CA (US)

(72) Inventor: Stephen Heckeroth, Albion, CA (US)

(73) Assignee: Solectrac, Inc., Albion, CA (US)

( * ) Notice: Subject to any disclaimer, the term of this patent is extended or adjusted under 35 U.S.C. 154(b) by 123 days.

(21) Appl. No.: 16/355,626

(22) Filed: Mar. 15, 2019

(65) Prior Publication Data

US 2019/0281755 A1 Sep. 19, 2019

Related U.S. Application Data

(60) Provisional application No. 62/643,389, filed on Mar. 15, 2018, provisional application No. 62/643,399, filed on Mar. 15, 2018, provisional application No. 62/643,408, filed on Mar. 15, 2018, provisional application No. 62/643,411, filed on Mar. 15, 2018, provisional application No. 62/643,423, filed on Mar. 15, 2018, provisional application No. 62/643,433, filed on Mar. 15, 2018.

(51) Int. Cl.
*A01B 59/06* (2006.01)

(52) U.S. Cl.
CPC .......... *A01B 59/067* (2013.01); *A01B 59/061* (2013.01); *A01B 59/066* (2013.01); *A01B 59/064* (2013.01)

(58) Field of Classification Search
CPC .... A01B 59/061; A01B 59/066; A01B 59/067

USPC ......................................................... 172/439
See application file for complete search history.

(56) References Cited

U.S. PATENT DOCUMENTS

| | | | |
|---|---|---|---|
| 3,561,789 A | 2/1971 | Stikeleather | |
| 4,508,176 A * | 4/1985 | Wiegardt | G05G 1/04 172/7 |
| 4,681,336 A | 7/1987 | Kryscyk | |
| 5,738,176 A | 4/1998 | Gingerich | |
| 5,746,275 A * | 5/1998 | Cross | A01B 59/068 172/246 |
| 5,988,294 A | 11/1999 | Hubscher | |

(Continued)

*Primary Examiner* — Gary S Hartmann
(74) *Attorney, Agent, or Firm* — John C Merchant

(57) ABSTRACT

An electric tractor including one or more all-electric bidirectional force exerting three-point hitch assemblies for lifting and lowering farm tool implements in level relationship to the ground regardless of the elevation of lift applied to the implement. The front, middle and rear three-point hitch assemblies are each operated using linear actuators. The hitches may be coupled with battery boxes to provide power and to counterbalance attached farm implements. Each of the described three-point hitch assemblies (including embodiments for front, middle and rear positions) may be operated through manipulation of electric controls. Electronic components include controller, displays, panels, wiring harnesses, linear actuators, joy sticks, lighting, switches, gauges, electric battery management system for managing one or more power sources, and processing modules and memory for controlling hitch movement and implements. The three-point hitch assemblies enable work in the front, middle and rear areas of the tractor.

2 Claims, 13 Drawing Sheets

(56) References Cited

U.S. PATENT DOCUMENTS

| | | | |
|---|---|---|---|
| 6,119,786 | A | 9/2000 | Creger et al. |
| 6,230,817 | B1 | 5/2001 | Haugen |
| 6,293,351 | B1 | 9/2001 | Schmidt |
| 7,828,099 | B2 | 11/2010 | Heckeroth |
| 8,028,766 | B2 | 10/2011 | Moore |
| 8,555,995 | B2 * | 10/2013 | Harris .................. A01B 59/064 172/810 |
| 9,469,171 | B2 | 10/2016 | Morga et al. |
| 2006/0210384 | A1 | 9/2006 | Warren |
| 2009/0321134 | A1 | 12/2009 | Matthews et al. |
| 2011/0147020 | A1 * | 6/2011 | Waltz .................. A01B 59/064 172/439 |

* cited by examiner

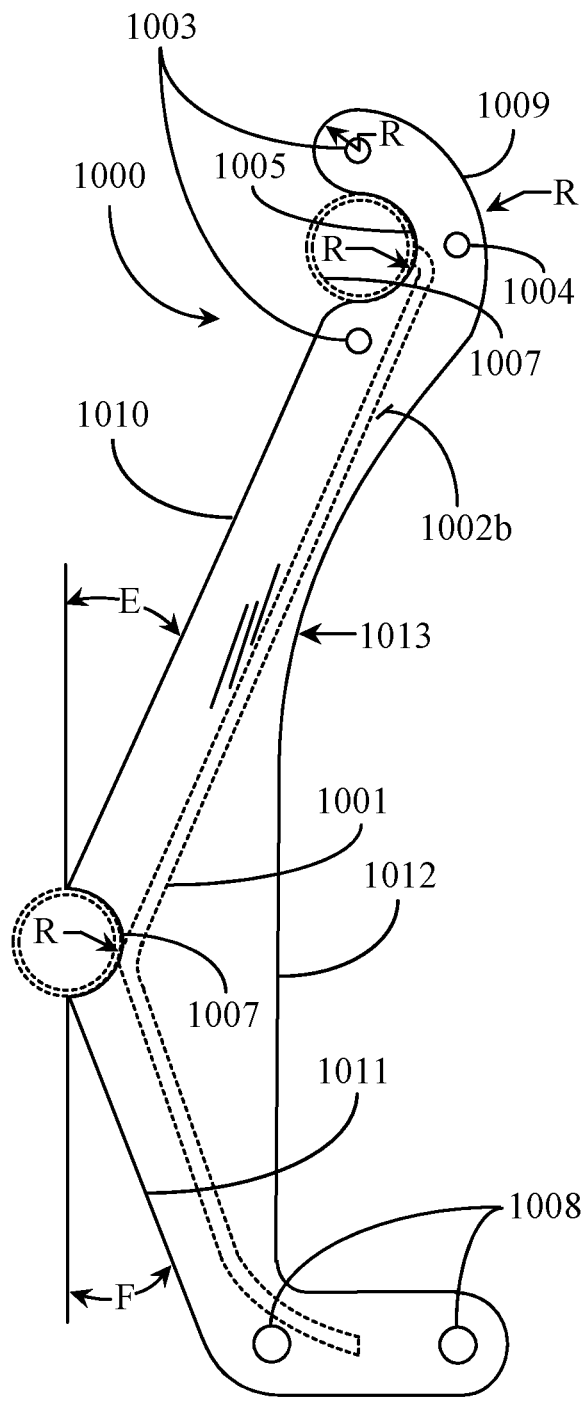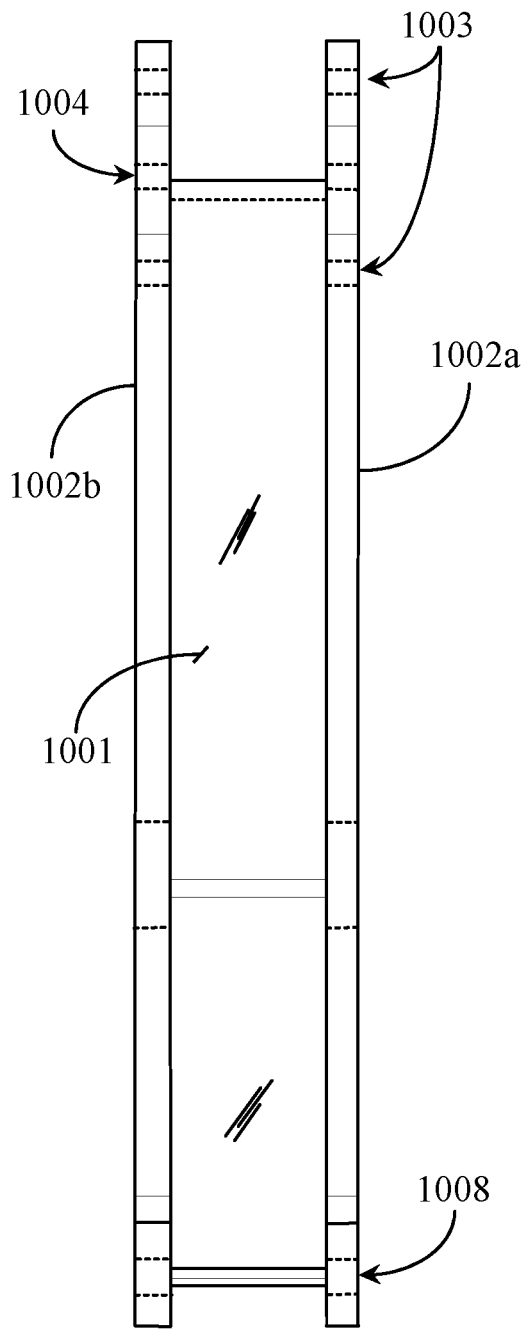
*Fig. 10A*  *Fig. 10B*

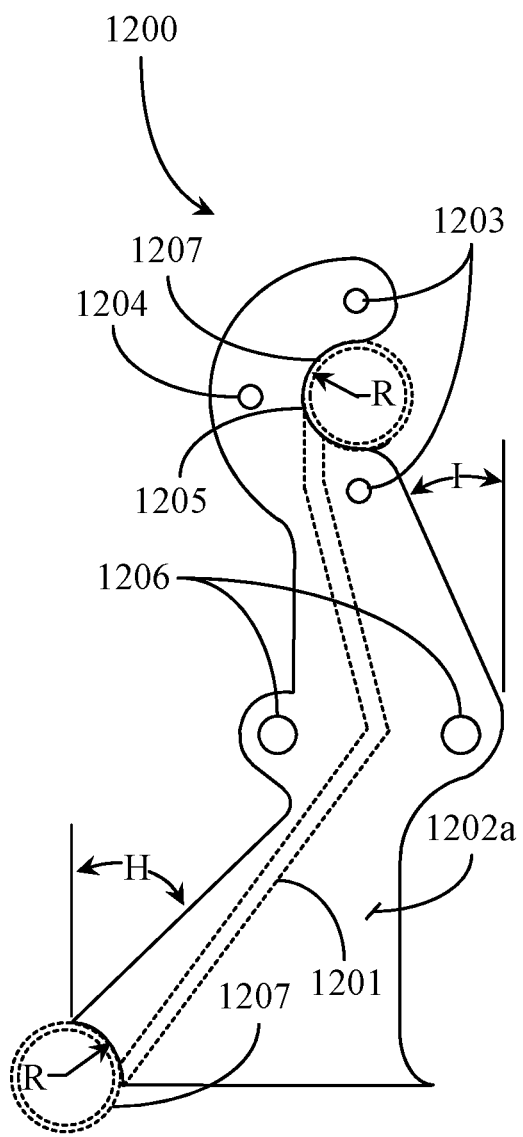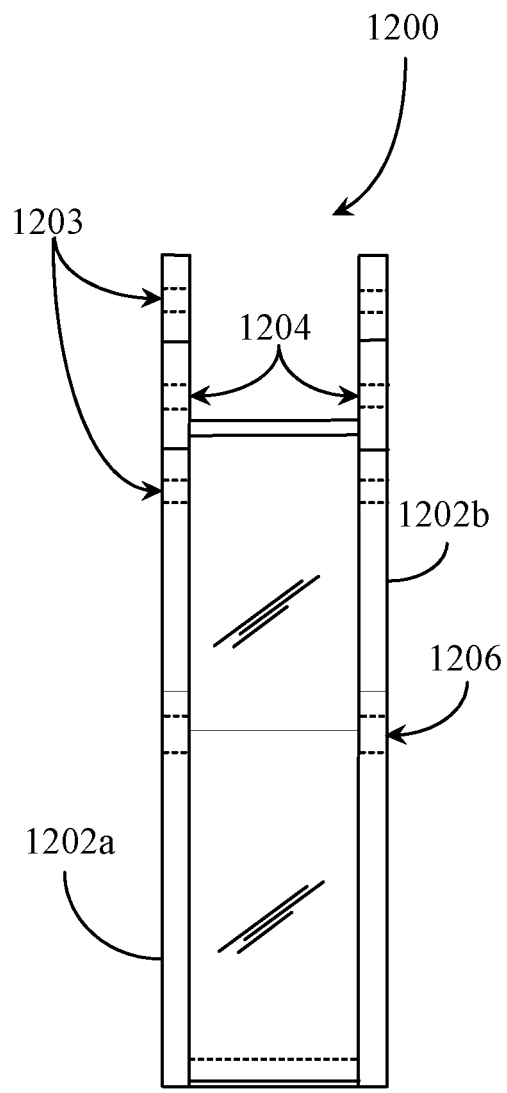
*Fig. 12A*  *Fig. 12B*

AGRICULTURAL VEHICLE WITH BIDIRECTIONAL FORCE EXERTING ELECTRIC THREE-POINT HITCH ASSEMBLIES

CROSS-REFERENCE TO RELATED DOCUMENTS

The present invention claims priority to the following six US provisional patent applications: Ser. No. 62/643,389 entitled All Electric Tractor Three Point Hitch Linear Actuator Apparatus; Ser. No. 62/643,399 entitled All-Electric Tractor Two Part Chassis Kit That Uses Front and Rear Electric Hitches as an Assembly Aid; Ser. No. 62/643,408 entitled All-Electric Tractor Three Point Hitch Exchangeable Batteries; Ser. No. 62/643,411 entitled A Front and Mid Three Point Hitch With Shared Upper and Lower Link Connecting Apparatus; Ser. No. 62/643,423 entitled Parallel Acting Three Point Hitch For All-Electric Tractors; Ser. No. 62/643,433 entitled Three Hitch All-Electric Tractor; all of which were filed on Mar. 15, 2018, the disclosures of each being included herein at least by reference.

BACKGROUND OF THE INVENTION

1. Field of the Invention

The present invention is in the field of agricultural vehicles including tractors and pertains particularly to methods and mechanical apparatus for increasing hitch operation capabilities, including increasing work space for implements, increasing run time efficiency, and reducing or eliminating toxic exhaust fumes and or potential for fluid leak from the vehicle.

2. Discussion of the State of the Art

In the agricultural field, much innovation has occurred with respect to methods and apparatus relative to farm vehicles and their abilities to cultivate, till, harvest, and otherwise perform crop and ground work associated with agriculture and in some cases, work associated with general landscaping and ground construction. At the time of this writing, conventional farm tractors continue to be gas or diesel consuming vehicles having a rear-mounted three-point hitch that may accept the typical farm tool implements such as tillers, scrapers, and the like.

Conventional three-point hitches may be mechanically-operated hitches having a pair of lower links and a top link that may be used to connect to a farm tool implement.

A conventional three-point hitch for commercial agriculture may be used by a tractor operator to lift farm tool implements off of the ground using a hand or foot lever, or if equipped, a hydraulically-operated lift cylinder to enable push-button operation of lifting and lowering the attached farm tool implements. Lowering an implement to ground relies on the weight of the farm tool implement to keep it in contact with the ground being worked.

Other prior-art limitations are apparent in conventional three-point hitch architectures such as the requirement for repetitive adjustments to the length of one or more hitch links in order to keep a farm tool implement level on ground and off ground or at a desired angle of operation with respect to the ground. Still other inefficiencies are apparent in conventional tractors relative to multitasking or the use of more than one farm tool implement simultaneously.

While some farm vehicles used commercially may be specially designed to perform more than one function simultaneously such as a combine harvester, for example a grain harvester, the general footprint of a conventional farm tractor does not support more than a front and or a rear three-point hitch because of space required by the gasoline or diesel tractor engine limiting operator access to additional work area beneath the tractor frame.

There is a general desire to introduce a tractor that does not rely so much or at all on fossil fuels and hydraulic pump and hose units to provide powered hitch operation. Electric conversion kits are available for some light-duty tractors, however commercial applications may require more power to be successful in a commercial farming environment than a conventional battery source might provide where longer run time is expected and frequent charging of depleted batteries may not be desired.

Therefore, what is clearly needed is an agricultural vehicle, for example, a farm tractor adapted to reduce or eliminate dependence on fossil fuels and hydraulic systems and that can enable continued operation of at least two all-electric bidirectional force exerting three-point hitches connected to farm tool implements.

BRIEF SUMMARY OF THE INVENTION

According to at least one embodiment of the present invention, the inventor provides an agricultural vehicle in the form of an all-electric tractor having an electric dive motor mounted on one of two or more tractor frame sections, the electric motor adapted to power a drive train to drive the tractor. The tractor includes at least one rechargeable electric power source mounted to or otherwise carried by the tractor or mounted on a frame section of the tractor, the electric power source having a wire connection to the electric drive motor for supplying power to the motor to drive the tractor via the tractor drive train.

The tractor has at least one mounted electric powered three-point hitch assembly having two elongate lower link bars and an elongate top link bar mounted for use to one of the two or more frame sections of the tractor, the at least one three-point hitch assembly having mechanical couplings at the end points of the link bars to connect to a farm tool implement. The tractor hitch assembly includes at least one electrically operated linear actuator capable of exerting bidirectional travel defined by extension and retraction capability along a linear track.

The at least one linear actuator is pivotally connected at one end to at least one of the lower link bars and is pivotally connected at the opposite end to a modular bracket pinned to a fixed bracket welded to or otherwise fixed to the frame, the linear actuator having a gear set to drive a screw and an electric motor connected by wiring to the at least one rechargeable power source and to an electric control box or panel having one or more controls operable by a user seated in a cab section of the tractor to raise and lower the three-point hitch assembly and any attached farm tool implement.

In one embodiment of the invention, a three-point hitch is provided and includes a pair of lower link bars pivotally connected at a same end to a first pair of fixed actuator brackets, the brackets oriented in a same direction and spaced apart and welded to or otherwise fixed to a frame element of a host vehicle, which may be a tractor vehicle. The three-point hitch includes a top link bar disposed centrally between the lower link bars, the top link bar pivotally connected at one end to a single fixed top link receiving bracket, the top link receiving bracket welded to or otherwise fixed to the frame element of the host vehicle at an elevated position on the frame element above and substantially in between the pair of fixed actuator brackets.

At least one modular actuator bracket is provided to the hitch for connection to a linear actuator and includes a pin connection interface for pinning to a like interface provided on at least one of the fixed actuator brackets. The at least one modular actuator bracket is pinned at the opposite end from the fixed actuator bracket to an electrically operated linear actuator capable of exerting bidirectional travel defined by extension and retraction capability along a linear track. The at least one linear actuator is pivotally connected at the opposite end from the modular actuator bracket to one of the lower link bars of the hitch architecture, or to a cross bar connecting the pair of lower link bars in the architecture, the linear actuator includes a gear set to drive a turn screw and an electric motor connected by wiring to the at least one rechargeable power source and to an electric control box or panel having one or more controls operable by a user seated in a cab section of the host vehicle to raise and lower the three-point hitch assembly. The three-point hitch assembly includes mechanical coupling means such as pinning hardware at the end points of the link bars to enable connection to and electric operation of any farm tool implement.

BRIEF DESCRIPTION OF THE SEVERAL VIEWS OF THE DRAWINGS

FIG. 10A is a left-side view of a fixed actuator support bracket for the front and middle three-point hitch assemblies according to an embodiment of the invention.

FIG. 10B is a rear end view of fixed actuator support bracket 1000 of FIG. 10A.

FIG. 12A is a left-side view of a fixed mid-hitch actuator support bracket modified to include top link receiver openings for the top link of the front hitch and the mid hitch according to an embodiment of the invention.

FIG. 12B is a front-end view of the fixed mid-hitch actuator support bracket of FIG. 12A.

DETAILED DESCRIPTION OF THE INVENTION

The inventor provides an agricultural vehicle in the form of a farm tractor that reduces or eliminates reliance on fossil fuel such as diesel fuel for power and reduces or eliminates reliance on a hydraulic pump system to power a three-point hitch for lifting and lowering farm tool implements. The present invention is described using the following examples, which may describe more than one relevant embodiment falling within the scope of the invention.

It is one object of the present invention to provide a commercial grade agricultural vehicle in the form of a tractor that, at least in one embodiment, includes a means of storing and utilizing a cleaner power source than a conventional diesel tractor such as an all-electric tractor having at least one all-electric, bidirectional force exerting, three-point hitch assembly, at least one rechargeable battery for electric power, and at least one electric motor for driving the vehicle. It is another object of the invention to provide a means for increasing the available ground work footprint of the tractor by providing at least two all-electric mechanical three-point hitch assemblies adapted to connect to a variety of farm tool implements and to exert force bidirectionally in lifting and lowering farm tool implements.

It is a further object of the invention to provide a means and a method of applying work force to the at least one all-electric three-point hitches in a bidirectional manner along at least one linear track and a means and method for overriding the work force applied to the downward direction of the at least one linear tracks. It is a further object of the invention to provide a means and method for keeping a farm tool implement coupled to at least one of the all-electric three-point hitches level in relationship to the ground regardless of the elevation of lift applied to the implement or implements through the three-point hitch or hitches. The present invention is described in enabling detail using the following examples, which may describe more than one relevant embodiment falling within the scope of the present invention.

Figure 1:
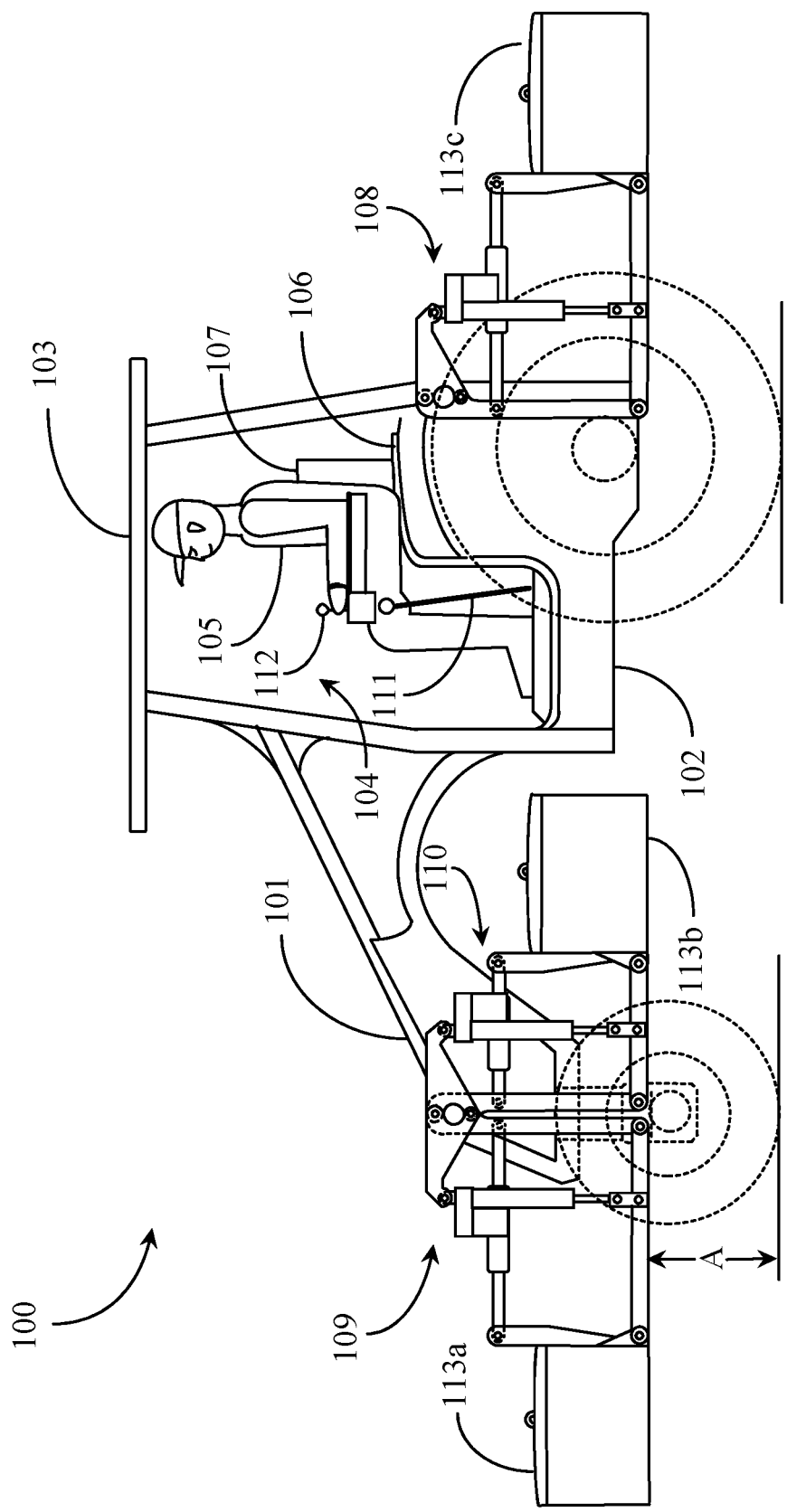
FIG. 1 is a left-side view of a tractor with at least one electrically powered three-point hitch according to an embodiment of the present invention.

FIG. 1 is a left-side view of a tractor 100 with at least one electrically powered three-point hitch according to an embodiment of the present invention. Tractor 100 may be provided, in one embodiment, through a manufacturer as a tractor kit requiring at least some assembly of loose components by a user. In one embodiment, tractor 100 includes a front tractor frame section 101 and a rear tractor frame section 102 wherein the two frame sections may be joined together by a user that may assemble the tractor from a kit of components.

In this embodiment, front tractor frame 101 and rear tractor frame 102 may be fabricated of steel tubing formed and welded at specific points and steel plating welded, clamped, or bolted to the frame to form the main chassis of the tractor. Tractor 100 includes a top canopy 103 to protect the user from the sun and rain, etc. Canopy 103 may be a steel frame with one or more than one platform section mounted thereon to cover at least the seating area or cab space 104 of the tractor.

In a preferred embodiment, tractor 100 is adapted to use an all-electric motor (not illustrated but assumed present) to propel the drive train and power take-off (PTO) of the tractor, if equipped. An all-electric motor of a same power rating than a stock diesel tractor engine may take as little as a fifth of the space or footprint. The space for a tractor engine is generally afforded just ahead of cab 104 where the operator sits such as an operator depicted herein as operator 105 seated in tractor seat apparatus 106 having a seat back 107. Therefore, an area remains open just in front of operator 105 that is made available to accept a mid-hitch assembly to accept certain farm tool implements for working the area or footprint of ground just ahead of the operator but behind the front end of tractor 100.

In this embodiment, tractor 100 includes an electrically operated rear three-point hitch assembly 108 that may include at least one linear ball/screw type actuator pivotally coupled to a lower link of the assembly and to an actuator bracket assembly to drive lifting and lowering of a farm tool implement coupled (generally by pinning) to the hitch assembly. In one embodiment, a pair (left and right) of linear actuators are provided and pivotally pinned or otherwise pivotally coupled to the lower links of the hitch assembly to apply force through powering the actuator to travel (extend and retract) to lift and to lower the lower links of rear three-point hitch assembly 108 in turn lifting and lowering an attached farm tool implement.

Rear three-point hitch assembly 108 is depicted herein as coupled to a farm tool implement in the form of a battery box 113*c* of a standard rectangular form housing multiple battery cells that may be harnessed collectively to provide power to the electric drive motor of the tractor and to other components requiring electric power such as the hitch actuators, tractor lighting, and other components or accessories. Battery box 113*c* may be manufactured from stainless steel or other durable corrosion resistant materials. Rear three-point hitch assembly 108 includes the active lower links, and a top link for coupling to a center vertical mast of a farm tool implement while the lower links couple to the bottom sides of the farm tool implement. In this embodiment, battery box 113*c* includes enough cells to power tractor 100 for approximately four hours of continuous operation before depletion thereof.

Tractor 100 may include a front three-point hitch assembly 109 coupled to a battery box 113*a* containing a second set of battery cells equal to or varying with the number of cells in battery box 113*c* depending on power need. Tractor 100 may include a middle three-point hitch assembly 110 that may occupy the space formerly reserved for a diesel (or gasoline/ethanol) tractor engine. A smaller electric motor for driving the tractor allows for the possibility of installing a middle three-point hitch assembly back to back to the front three-point hitch assembly 109. In this example, tractor 100 is depicted having middle three-point hitch assembly 110 coupled to a third battery box 113*b* containing a same or like number of battery cells as boxes 113*a* and 113*c*. Moreover, tractor 100 may also include an on-board main or primary battery (not illustrated) that may, for example, be disposed beneath operator 105 within a space or compartment reserved for that purpose under seat apparatus 106.

In actual practice, there may be four or more battery boxes transported by tractor 100 at one time, three coupled one each to the three available hitch assemblies and one or more within the resident battery box (not illustrated) assumed herein disposed beneath the seat 106 of the user 105. In actual practice, perhaps fewer than three battery boxes like boxes 113*a-c* are transported by hitch or attachable trailer to enable at least one of the three available hitch assemblies to be coupled to a farm tool implement that may be in operation while one or more other batteries are transported by hitch. For example, rear three-point hitch assembly 108 may be coupled to a heavy farm tool implement such as a tilling implement, whereby front three-point hitch assembly 109 and or middle three-point hitch assembly 110 may be coupled to battery boxes to help counterbalance the weight at the rear of tractor 100, and of course to provide extra battery power for longer run times.

In different applications, other arrangements may be observed such as running a farm tool implement at the rear of the tractor using rear three-point hitch assembly 108 and simultaneously operating a farm tool implement at the middle three-point hitch assembly 110, while a spare and fully charged battery box is transported at the front three-point hitch assembly 109 to help balance tractor load distribution and to provide the additional power of one battery box of battery cells to lengthen run time. In this view, tractor 100 is transporting all three available battery boxes by hitch elevated to mid-level and no farm tool implements are connected.

In a preferred embodiment, each of the described three-point hitch assemblies (front, middle, and rear) may be operated by user 105 through manipulation of one or more control sticks, buttons, switches, knobs or sliders 112 provided on one or more electric control panels accessible to the user 106 within cab space 104. A control lever 111 may also be provided to set tractor gearing to forward travel, stop or idle, and reverse travel. One or more control panels and wiring harnesses may be provided to afford plug and play connection to fresh battery boxes and to secondary electric motors that operate the actuators controlling lower links of each of the illustrated hitch assemblies. Front and rear tractor tires are depicted herein by reference in broken boundary lines.

Electronic components may be installed into cab section 104 of tractor 100 such that they are accessible to the operator 105 without the operator having to exit the cab or move off of seat apparatus 106. Electronic components provided may include but are not limited to a motor and motor controller, at least one converter and an electric panel, plug and play wiring harnesses, linear actuators, joy sticks, lighting, switches, gauges, and an electric battery management system for managing one or more power sources. In the event tractor 100 is provided in the form of multiple components in a kit that may be assembled as a tractor, front three-point hitch assembly 109 and rear three-point hitch assembly 108 may be operated simultaneously by operator 105 manipulating hitch operation controls to lift the assembled tractor frame off of the ground to at least a distance depicted herein as distance A sufficient to enable the operator to install the tractor tires depicted in this view by broken boundary lines.

The available hitch assemblies, rear three-point hitch assembly 108, front three-point hitch assembly 109, and middle three-point hitch assembly 110 may each include a pair of vertically-oriented fixed actuator support brackets that are mounted or welded in positions on the tractor frame so that each fixed actuator support bracket may host a modular actuator connection bracket that may be nested to and pinned to, or otherwise joined with, the fixed bracket in order to support a linear actuator. Each modular actuator connection bracket may in turn be pinned to the motor and gear end of an all-electric linear actuator. The all-electric linear actuator is pivotally mounted to a lower link or lower link bar assembly. The lower link bar assembly may be pivotally connected at one end to receivers on the vertically oriented fixed actuator support brackets and at the opposite end to receiver brackets on the farm tool implement where a receiver bracket exists for each lower link of the three-point hitch.

The top links of each of the described hitch assemblies may, in one embodiment, be length adjustable. A top link may be pivotally connected at one end to a receiver bracket welded to the tractor frame, the top link being typically disposed relative to spacing in between the lower links at substantial center of the host hitch assembly. A top link of one of the described hitch assemblies may be pivotally connected at the opposite end to a vertically oriented center-mast that is part of the farm implement frame structure. The frame structure typically includes a tool bar with a farm implement removably connected to or fixed to the tool bar, and perhaps one or more structural support bar or stabilization bar. Tool bars, farm implements, and stabilization bars are well known to one familiar with the art and are therefore not shown in the illustration.

The three-point hitch assemblies 108-110 of the present invention enable an operator to connect farming tool implements to work the ground or crop in the front area of the tractor, behind the tractor, and in the middle area of the tractor just ahead of a seated operator. Each work area (generally defined by the positioning of the front, rear, and middle three-point hitches shown) provides specific advantages relative to task performance. For example, the front work area covered by front three-point hitch assembly 109 is suitable for a mower or a harvester ahead of the front wheels of the tractor 100. The middle work area covered by the middle three-point hitch assembly 110 is suitable for precision cultivation tasks because of the unobstructed view of the middle work area relative to a seated operator. The rear work area covered by rear three-point hitch assembly 108 is suitable for a tilling implement, a disc implement, a grating implement, or a harrow implement.

The implementation of an all-electric ball/screw type linear actuator to power the lower links of each hitch assembly allows the operator to exert downward torque or force against the hitch lower links, which would not be available to a hydraulically powered cylinder used in tractor hitch assemblies. Typical downforce is achieved only by the weight of the farm tool implement. For example, float mode on a standard tractor is always in play due to the fact that no force is exerted downward on the lower links. A specific mode of operation of the all-electric three-point hitches described above is provided later in this specification. In a preferred embodiment, the stock tractor length and turn angle capabilities are not altered in any way by adding a middle three-point hitch assembly 110. In a preferred embodiment, the front and middle hitch assembly components may share features on fixed support brackets hosting link receiver openings for both the front and rear hitch assemblies. Fixed support brackets are a pair of sub-components of the described three-point hitch assemblies 108, 109, and 110 and are described in further detail later in this specification. A unique bracketing arrangement enables more work space with a smaller hardware footprint.

It may be noted herein that middle three-point hitch assembly 110 may include a single linear actuator connected to a lower link bar assembly consisting of two lower links connected to receivers on the support brackets and a cross bar that may include ball socket ends for attaching to a farm tool implement. The middle hitch assemblies may consist of a single fixed actuator support bracket welded to frame members in between the front hitch assembly support brackets wherein the linear actuator has connection to a modular actuator connection bracket pinned thereto and to the single fixed support bracket and wherein the lower end of the actuator shaft has a pivotal connection to the cross bar (not shown). In this embodiment the middle three-point hitch assembly 110 may utilize a single linear actuator to raise or lower the farm tool implement or battery box 113b in this case.

Figure 2:
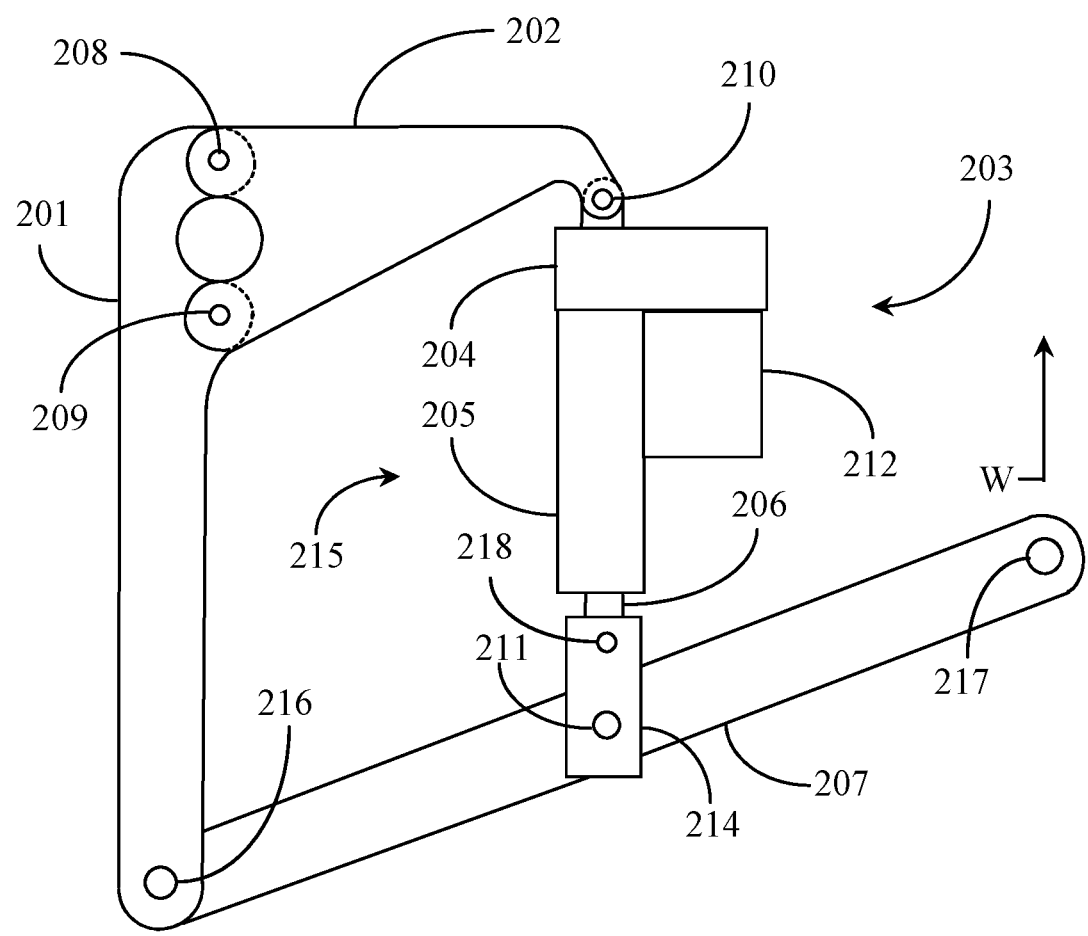
FIG. 2 is a right-side view of a linear actuator powered hitch assembly depicted in a fully retracted position with the top link removed.

FIG. 2 is a right-side view of a linear actuator powered three-point hitch assembly 203 depicted in a fully retracted position with the top link removed. Hitch assembly 203 may be analogous to the three-point hitch assemblies 108 or 109 of FIG. 1 and may be a rear hitch assembly or a front hitch assembly without departing from the spirit and scope of the present invention. More particularity, the front and rear hitch assemblies may be interchangeable while the middle hitch assembly (110, FIG. 1) includes lower links that may be shorter in length to make room for farm tool implements used specifically in the middle footprint of tractor 100.

Hitch assembly 203 is a three-dimensional assembly having a pair of fixed steel actuator brackets 201 defining, by disposed position, the overall width and the height dimensioning of the three-dimensional assembly. Fixed brackets 201 may be steel brackets (or made of similar heavy duty materials) that are positionally interchangeable parts that may be welded (preferred), for example, or otherwise fixed to frame elements of tractor 100 using hardware or a combination of welding and hardware mounting. It should be noted herein that each bracket 201 includes two bracket plates (right, left) that are spaced apart in width and held sufficiently parallel in planar relationship using a spacer plate or plates to bridge the bracket plates and to reinforce the strength of the brackets.

Bracket plates may have a nominal thickness dimension of one quarter inch or less. In this example, each fixed bracket includes a lower portion or end having at least one pin hole opening 216 aligned and extending through both bracket plates to accept one end of a pair of lower hitch links 207. Hitch links 207 may be steel (or like material) elongated bars having a thickness dimension, a height dimension, and an overall length dimension. The free ends of lower hitch links 207 hosting pin holes 217 are reserved for pinning to receiver pin holes provided for connection purposes on a farm tool implement tool bar or base structure thereof typically at the lower right and lower left sides of the farm tool implement. Such farm tool implement tool bars or base structures are well known in the art of three-point hitches.

The upper portion of fixed actuator support brackets 201 may be pivotally connected, in this case by pins 208 and 209 to a pair of modular actuator connection brackets 202. Bracket 202 may be unpinned and removed from bracket 201. Modular actuator bracket 202 is a three-dimensional bracket similar to fixed actuator support bracket 201, having two bracket plates of nominal thickness of one quarter inch or less aligned and spaced apart in a parallel planar relationship using a spacer bar or bars as described further above for fixed actuator support brackets 201. In one embodiment, the width from outside-to-outside of the bracket plates of bracket 202 is just narrower than the inside-to-inside width of the fixed bracket 201 to enable bracket 202 to nest within bracket 201 and be pivotally pined thereto using pins, namely upper pin 208 and lower pin 209.

Bracket 202 has a triangular profile that angle down to the free end of the bracket, which may be pinned to a motor and gearbox end of a linear actuator 215 by a pin 210. Linear actuator 215 is an all-electric bidirectional actuator capable of exerting work force in both directions along the linear track and capable of locking at any point along the linear track length. Linear actuator 215 includes an electric motor 212 connected to a set of gears in a gear box 204 having connection to the linear track apparatus, in this case a rotable screw that may be turned clockwise or counter clockwise to effect power extension of an actuator shaft 206 or power retraction of actuator shaft 206. An actuator track housing 205 is provided to protect the screw and other components such as a threaded ball interface from exposure to the outside elements.

The lower end of shaft 206 has connection by pin, bolt, screw, or other hardware 218 to a lower link control bracket 214 that may be pivotally connected to lower link 207 by using pin 211. Lower link control bracket 214 may be a u-shaped piece of steel open at the bottom that fits over the lower link bar such that a pin 211 may be used to pivotally connect it over the lower link bar 207 through a pinhole provided through the bar for that purpose. Pin 211 connects the bracket 214 to bar 207. Pin 216 connects the lower link 207 to the fixed bracket 201.

In this view, upper pin 208 and lower pin 209 are inserted and actuator 203 is fully or nearly fully retracted presenting the lower links 207 at the uppermost angle relative to the pivot point at the lower portion of bracket 201. Lower links 207 are the sole active (controlled movement) links of the hitch assemblies whereby each link may be driven by an actuator 215. In one application it is possible to fix the lower links 207 in the same plane with a cross bar so that a single actuator 215 might be employed to lift the lower links in tandem without departing from the spirit and scope of the invention. However, using two actuators (one at each side of a three-point hitch assembly) doubles the available torque and applies the same equal amount of force to each lower link. With both pins 208 and 209 inserted, actuator 215 may be retracted for lifting force or extended to apply downward force while bracket 202 remains in a stable pined orientation (not pivot able) to fixed bracket 201.

In this view, lower link 207 is lifted up according to the directional arrow using the work force (W) enabled by the actuator. In one embodiment, linear actuator 215 includes a scale apparatus (not illustrated) that can be electronically linked to a computer numerical control (CNC) display accessible to an operator within the cab area of the tractor. In this way, the operator may manipulate a pair of linear actuators 215 in tandem, retracting them and extending them equally in tandem using a single control means and to within a specified tolerance dimension of extension or retraction wherein the scale reading of the read-out CNC display can be zeroed out for reset by the operator. In this way precision elevation of a farm tool implement to within a specified tolerance is possible.

Figure 3:
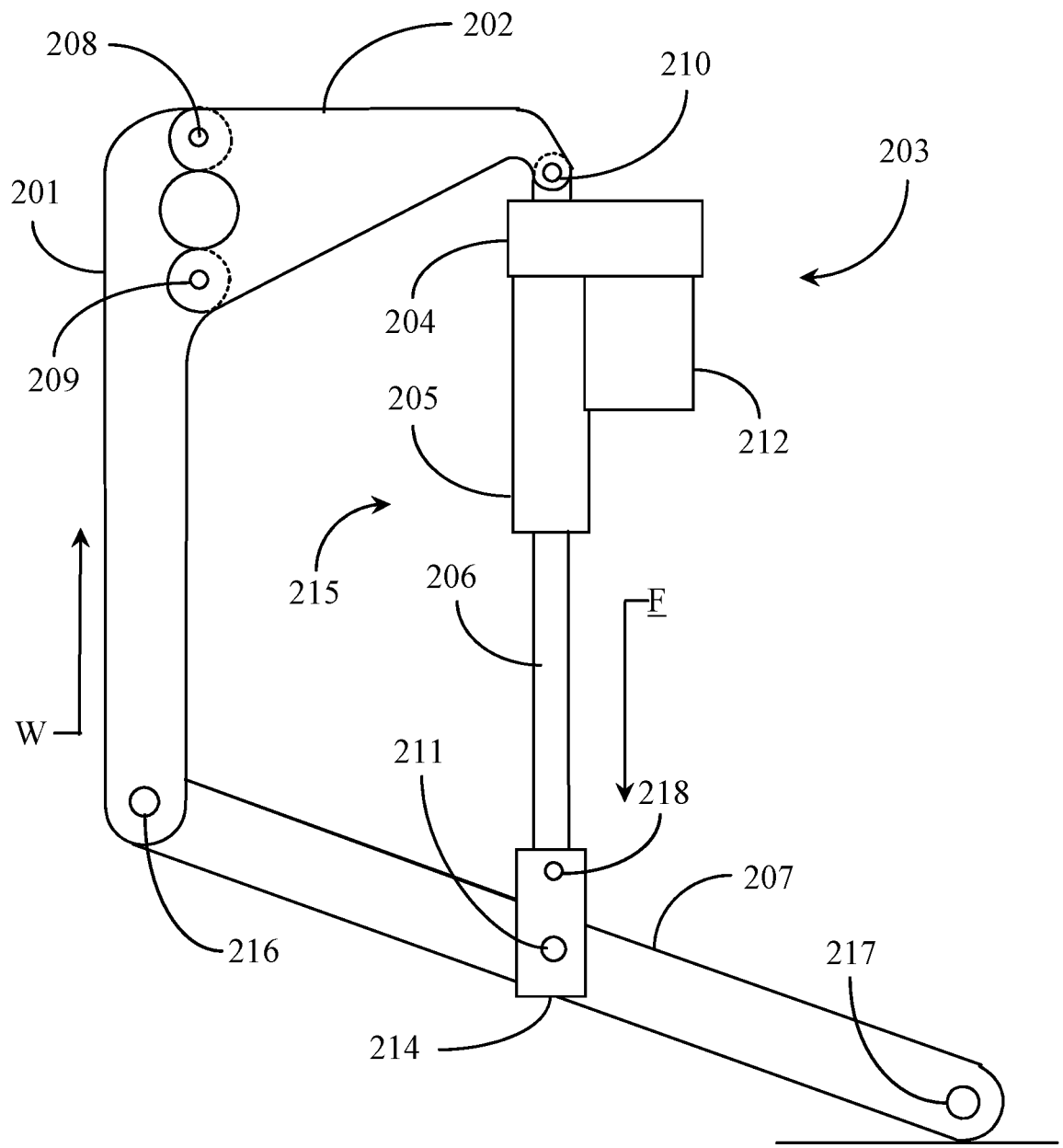
FIG. 3 is a right-side view of the linear actuator operated hitch assembly of FIG. 2 in a fully extended position with the top link removed.

FIG. 3 is a right-side view of linear actuator operated hitch assembly 203 of FIG. 2 in a fully extended position with the top link removed. One familiar with the art will note that a top link is a standard part of a three-point hitch (located top center) and hangs down if not connected to a farm tool implement. Top links are illustrated in FIG. 1 and given description and element numbers later in the specification. In this view, linear actuators 215 (pair) are fully extended driving lower links 207 downward about pins 216 against ground according to force (F) downward along the linear track of the actuator. In this operation, both pins 208 and 209 remain inserted preventing modular actuator connection bracket 202 from rotating out of position with fixed actuator support bracket 201. This operation enables an operator to lift the tractor completely off of ground according to workforce W wherein the weight of the tractor is loaded into the fixed brackets frame and down to the sturdier lower links 207.

Actuators 215 are capable of more force than standard hydraulic lift cylinders and are not limited to exerting force in a single direction. An operator may place pillow blocks between the free ends hosting pinhole 217 of lower links 207 and ground, depicted herein by a lateral line, in a process using the assembly as a jack. In one embodiment, an operator may pin a pair of shoes or blocks (not illustrated) to the free ends of lower links 207 identified by pin hole 217 to afford a better more stable contact footprint for the four contact points made by the lower links against ground.

In one embodiment, an operator may use the front and rear hitches to jack up one end or another end of the tractor for replacing tires, or for performing other tasks requiring access to the underside of the tractor. Linear actuators 215 may be up to 20 times more efficient than a hydraulic cylinder in lifting the same amount of weight. Ball and screw linear actuators are precise and are used in high force press machines due to a capability of producing very high torques using a small amount of power and a small electric motor and gear architecture to turn the screw clockwise or counter clockwise to extend or retract the actuator.

Figure 4:
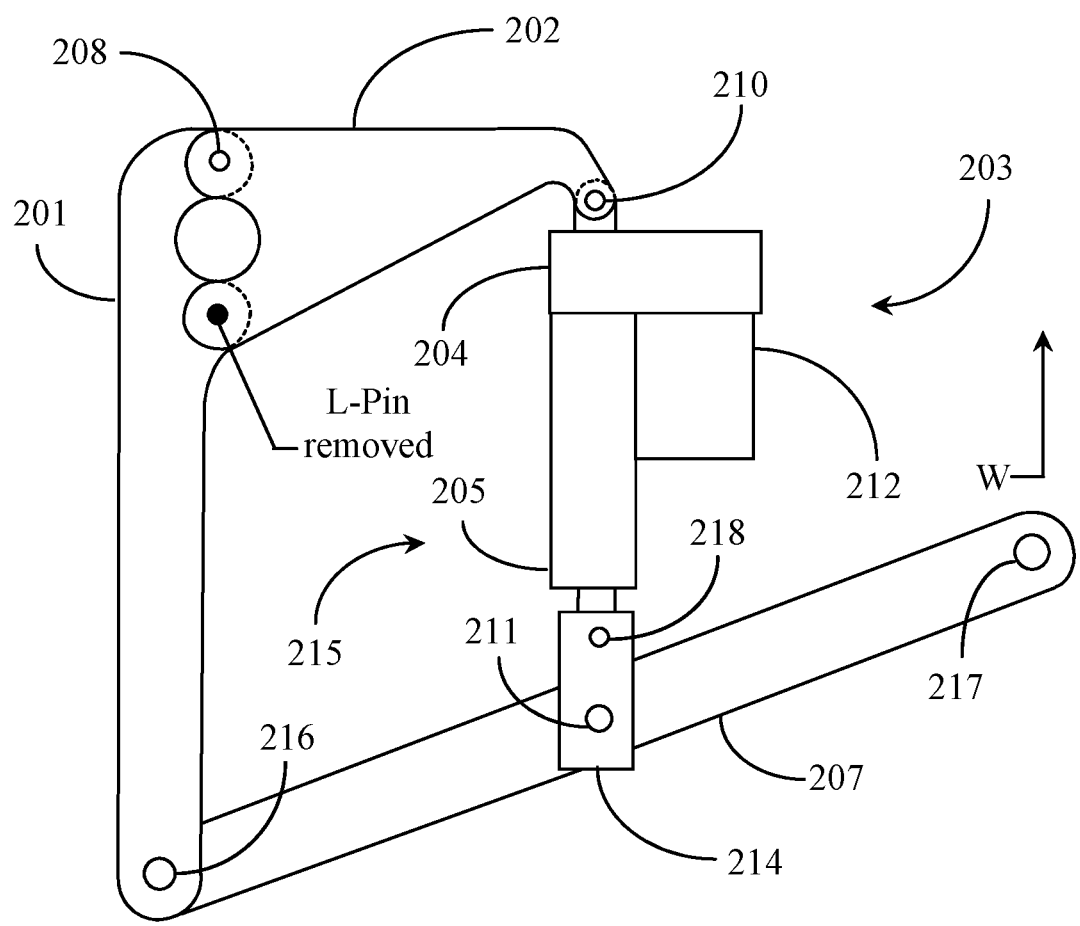
FIG. 4 is a right-side view of the linear actuator operated hitch assembly of FIG. 2 in a fully retracted position with a lower bracket pin removed for enabling a float mode in the hitch assembly.

FIG. 4 is a right-side view of the linear actuator hitch assembly 203 of FIG. 2 in a fully retracted position with a lower bracket pin removed for enabling a float mode in the hitch assembly. In one embodiment, it is desired that a farm tool implement float mode is provided as an option for enabling a farm tool implement to float over a potential obstacle that may be encountered in a field being worked by the tractor.

An operator may remove the lower pin 209 (shown on FIG. 3) from its position joining bracket 202 to bracket 201 as depicted herein by a solid dark pin opening and indicated by label L-pin removed. Without the lower pin, an operator may continue to exert linear torque to lift lower links 207 and hold them in a fully retracted position wherein the downward force of gravity acting on the bracketing interface prevents bracket 202 from pivoting out of an orthogonal relationship to fixed bracket 201. In this embodiment, lifting lower links 207 according to W is identical to the same operation executed with both pins (208 and 209) inserted.

Actuator 215 may also be extended without the lower pin 209 inserted. But if in extension of linear actuators 215, or while they are extended for that matter, the connected farm tool implement makes contact with an obstacle like a rock or root sticking up from ground level, the fact that the lower pin is removed for float mode enables modular bracket 202 to pivot upward to a maximum pivot range of perhaps 45 degrees about pin 208 the specific extent of which may be limited only by architecture constraints of the tractor above the bracket. In one embodiment of the invention, a pin puller mechanism connected to a solenoid switch (not illustrated) may be utilized to pull lower pin 209 from the bracket assembly allowing the operator to activate float mode from the cab of the tractor by pushing a button. A pin puller mechanism is not illustrated in this example but may be installed via clamp or weld to the appropriate frame member.

Figure 5:
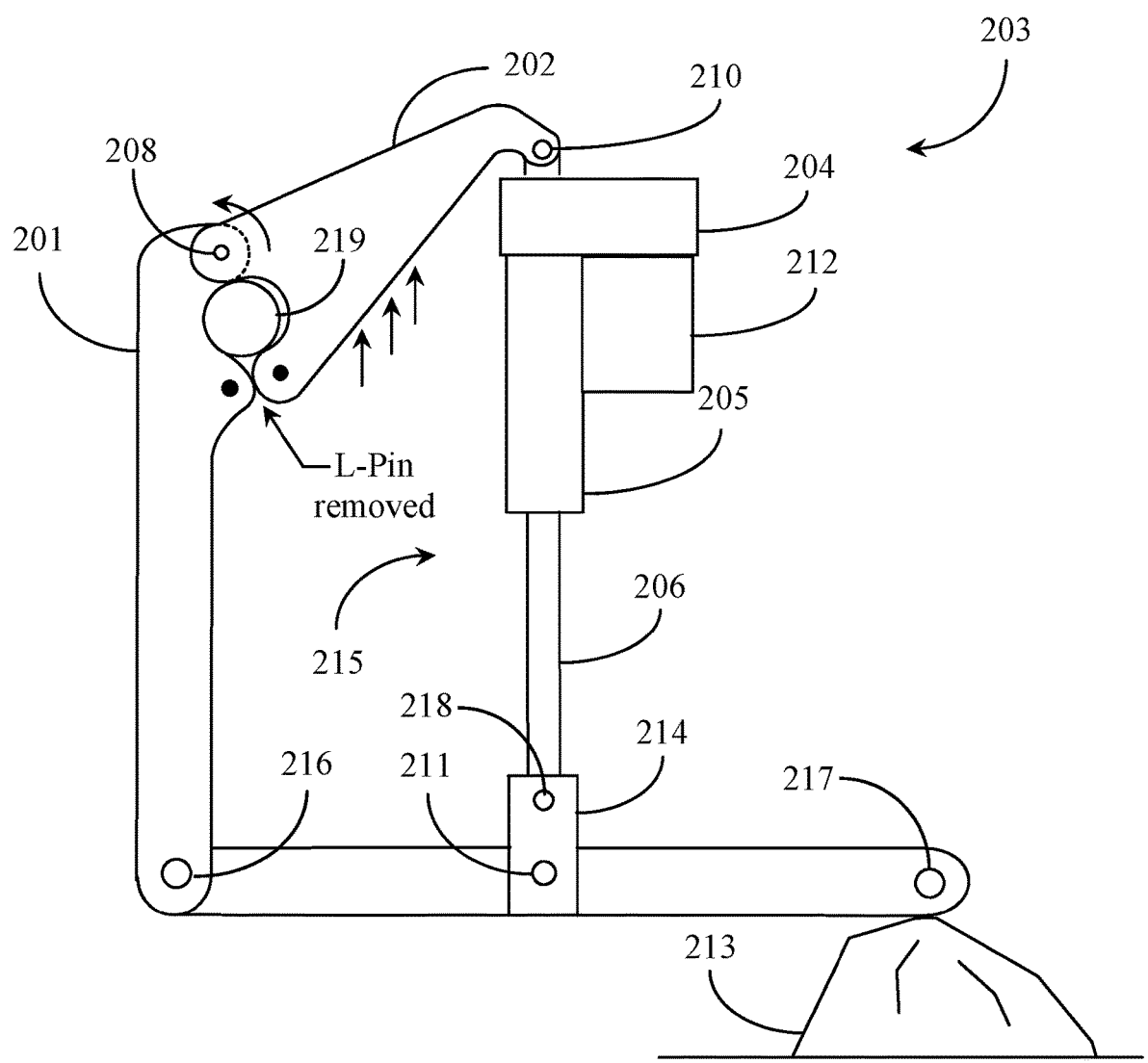
FIG. 5 is a right-side view of the linear actuator operated hitch assembly of FIG. 4 in float mode over a field obstacle according to an embodiment of the invention.

FIG. 5 is a right-side view of the three-point hitch assembly 203 utilizing a linear actuator 215 of FIG. 4 in float mode over a field obstacle according to an embodiment of the invention. In this embodiment, the linear actuator 215 is extended and locked (not turning) relative to each actuator. In this view a physical separation of bracket 202 from fixed bracket 201 is depicted due to an upward force against lower links 207 created by obstacle 213 such as a rock or other hard obstacle and the fact that the lower pin (see 209 on FIG. 4) is removed enabling bracket 202 to pivot upward with the force exerted by driving over obstacle 213. Linear actuator 215 is bidirectional with respect to exerting force to control the elevation and angle of lower links 207. If lower pin 209 (see FIG. 4) were left in place instead of being removed for float mode, the force exerted upward against the locked hitch assembly might damage a farm tool implement or the actual hitch assembly components including the actuators.

In actual practice, brackets 201 and 202 are pinned over a tubular frame member of the tractor, to which the fixed bracket 201 is also welded to or otherwise fixedly attached to such as by bolting or clamping. Welding is typically preferred to avoid shifting or slipping (clamp) or loosening of a bolted installation. This is depicted herein by bracket 202 pivoting up and around pin 208 exposing the tube frame surface 219. Float mode is very useful for a farm tool implement that retains ground contact under gravity of its own weight. Removal of the lower pin 209 obfuscates the upward force by absorbing that force in bracket separation of bracket 202 from fixed bracket 201. The upward range of pivot is limited only be the architecture of the tractor above the bracket 202 so if there is an open or material relieved structure providing space above bracket 202, a 45-degree tilt or as much as the pivotal connection at the end of bracket 202 and actuator gearbox 204 may allow without damage to any of the hitch components. An operator may also retract actuators 215 in float mode until the weight of the farm tool implement attached acts to reverse pivot of bracket 202 so that lower pin (209) may be reinserted.

Figure 6:
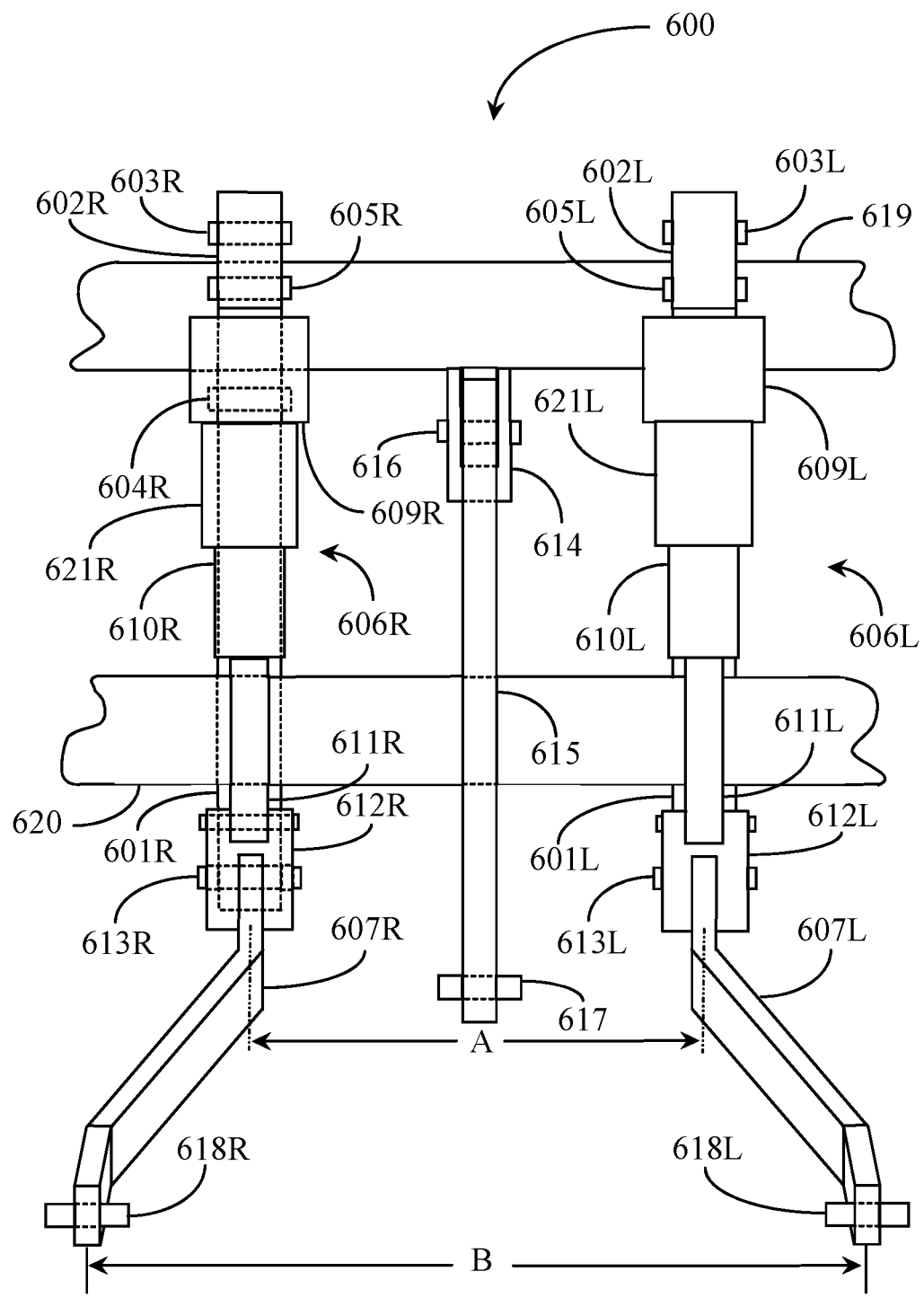
FIG. 6 is a front-elevation view of an electrically powered three-point hitch assembly with the top link depicted according to an embodiment of the invention.

FIG. 6 is a front-elevation view of an electrically powered three-point hitch assembly 600 with the top link 615 depicted according to an embodiment of the invention. Three point hitch assembly 600 is analogous to hitch assemblies 108 or 109 of FIG. 1 whereby a top link depicted herein as a top link 615 may be provided in the form of a steel stock three-point hitch top link or in the form of a length adjustable stock three point hitch top link wherein the length adjustment mechanism is a turnbuckle as is discussed later in this specification. In this view, lower link 607R (R=right link) and lower link 607L (L=left link) are depicted with link pins 618R and 618L for connection to a farm-tool implement that includes the three connection points of a three-point hitch, typically two points for the lower links, and one for the center top link 615.

It is noted herein that the right side of hitch assembly 600 is depicted with visible hidden lines showing pins and other features otherwise not visible. Fixed brackets 601R and 601L are spaced apart and welded to tractor frame members 619 and 620 presenting horizontally and disposed at different elevations and offset with respect to vertical alignment with frame member 620 presenting ahead of or in front of frame member 619. Tractor frame members may be steel tubes presenting horizontally and provide a secure welding location for accepting the vertically oriented fixed actuator support brackets 601 R (right bracket) and 601L (left bracket). Frame members 619 and 620 may be steel tubular frame members having an outside diameter (OD) that mates with an inside radius provided as material relief cut outs on the fixed actuator support brackets 601R and 601L. Brackets 601R and 601L may be welded to frame members 619 and 620 in substantially vertical orientation.

The center line to center line dimension A defines the distance between the lower links 607R and 607L at the rear portion of the three-point hitch assembly 600. The lower links may be bent to angle outward for a distance toward the front area of the hitch and then bent straight again to define a center line to center line dimension B as a nominal width dimension enabling pin attachment of the hitch to a farm tool implement. Actual dimensions are not a matter of limitation however an exemplary distance for dimension A may be about 15 to 18 inches or so to maintain containment within the wheel base width of the tractor and dimension B about 26 inches apart at the connection points to an attached farm-tool implement (not shown).

Modular actuator brackets 602R and 602L are fabricated with an overall width dimension held just smaller than an inside width dimension held in fabrication of fixed actuator support brackets 601R and 601L in order to nest the brackets together and align the pin holes for accepting bracket connector pins 603R, 603L, 604R, and 604L analogous to upper pins 208 (two each) and lower pins 209 (two each) of FIG. 2. The narrow ends of modular actuator connection brackets 602R and 602L are pivotally connected to linear actuator assemblies 606R and 606L using pins 605R (visible broken lines extending through the hole) and 605L (not depicting broken lines). It is noted herein that aside from bracket alignment pin holes, there may be an additional pin hole or pin holes placed through fixed brackets or modular brackets that function as a storage location for a pin removed to enable float mode and or for storing one or more spare pins.

Linear actuator 606R is pivotally connected at substantial center line of the vertical linear track and an actuator track housing 610R of the actuator in concentric fashion. Track housing 610R is analogous to track housing 205 of FIG. 2. Wiring (not depicted) may be run through one or more electric harnesses to between the connected battery or batteries and a user control panel to each actuator motor 621R and 621L. A gear set, including a base drive gear on the turn screw of the actuator is provided within gear boxes 609R and 609L. The actuator gear set in gear box 609R or 609L may include gears for achieving more than one torque power that may be selectable to engage and disengage within the box. Motor 621R or 621L may include a reverse drive and a forward drive selection for retraction and extension and a stop position enforceable from the control panel using a joystick or other interface means such as switches, a slider, a button set, or the like.

The lower ends of actuator shafts 611R and 611L are pinned to or otherwise connected to lower link control brackets 612R and 612L analogous to control brackets 314 of FIG. 2. In turn, lower lift brackets 612R and 612L are pivotally pinned to respective lower links 607R and 607L via pins 613R and 613L analogous to pins 211 of FIG. 2. As the lower links are raised or lowered in tandem, they pivot about the pins connecting them to fixed brackets 601R and 601L and pivot about the pins connecting them to the linear actuators 606R and 606L. The lower link pins connecting the rear ends of lower links 607R and 607L to the lower link receiver portions of fixed actuator support brackets 601R and 6010L are not visible in this view.

Top link 615 is, in this embodiment, pivotally connected to a top link bracket 614 by a pin 616. Bracket 614 may be welded to frame member 619 at a point along frame member 619 that is substantially centered between the actuator bracket assemblies. Top link 615 may hang down in center when not connected (pinned) to a mounting point on a fixed center mast of a farm tool implement by pin 617. As shown in FIG. 6, the top link 615 is hanging vertically downward because it is disconnected from a farm tool implement. In one embodiment, top link 615 is manually adjustable in length by an operator and in one embodiment the length adjustment mechanism is a turnbuckle device for setting correct distance and making small adjustments.

In one embodiment, top link 615 may be an electrically powered linear actuator of a same or smaller power rating than the actuators controlling the lower links. In this embodiment, the actuator may be semi-automatically adjustable in length to maintain a desired connection length with the center mast of a farm tool implement where a length adjustment may be made by a control interface or panel controller such as a switch, joystick, slider or a button set. In one exemplary use case scenario, a farm tool implement for the tractor may consist of a scoop bucket for the front of the tractor that may be raised or lowered in a level position and wherein the center top link actuator may be operated to change the angle presentation of the bucket such as to rotate the bucket about the pins at the lower sides of the bucket using the top center actuator extending or retracting the actuator to change angle of presentation as desired.

The top link actuator in the above alternative embodiment replacing stock top link 615 may control sit or idle position, scoop position, pick up load angle, and dump load angle. In other words, in this embodiment, top link 615 is itself a linear actuator in which case there would be three linear actuators in the assembly. In one variation of this embodiment, the linear actuator functioning as a top link may include an electronic linear scale reader connected to a numerical digital read out display within the cab of the tractor and visible to the operator. In this way, the operator quickly and accurately set top link bucket angle presentations and record those values in memory provided in a computer-aided control panel interface (if equipped) in association with each work mode rest, scoop, pick up load, and dump load.

Figure 7:
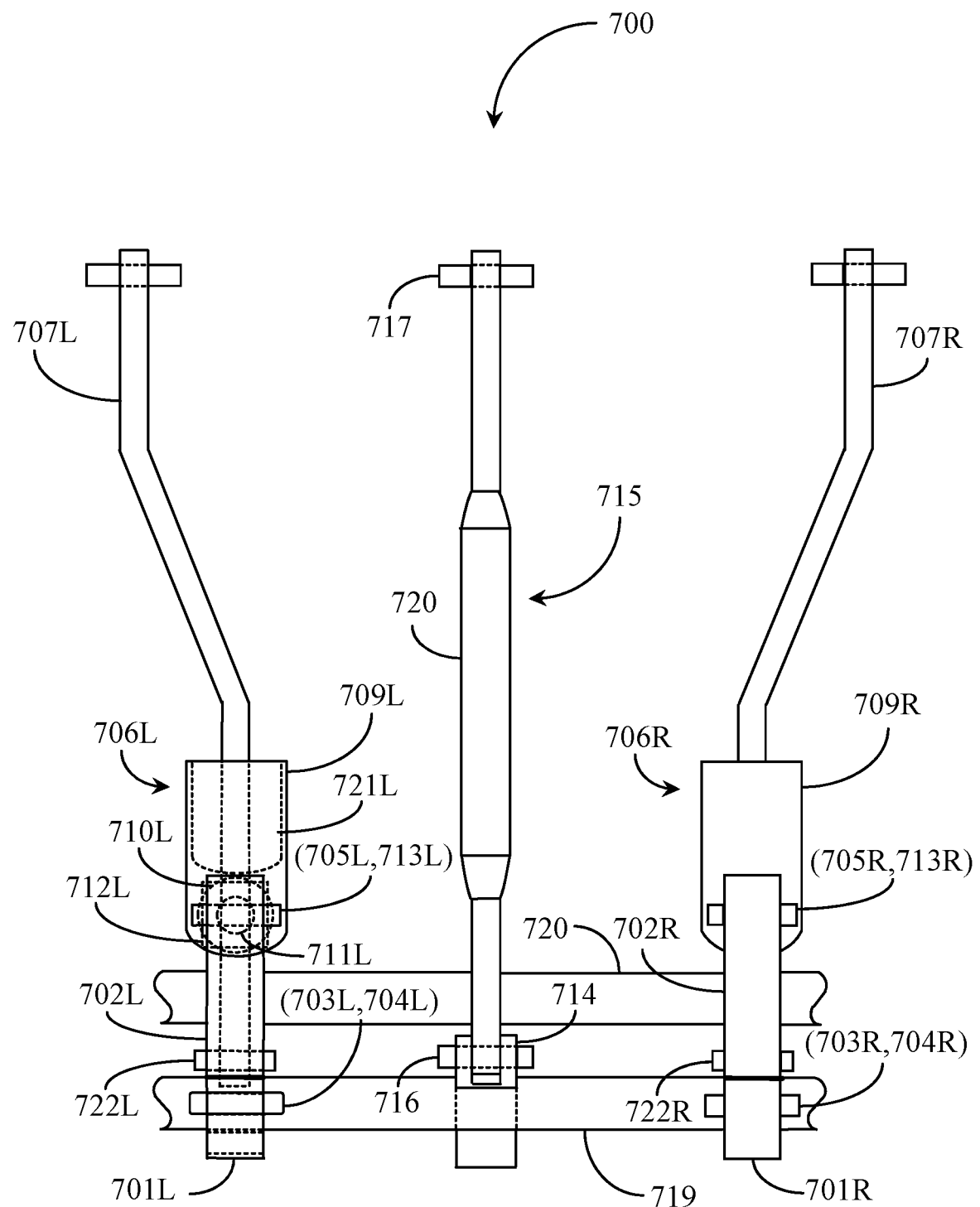
FIG. 7 is an overhead view of an electrically powered three-point hitch assembly with the top link depicted according to an embodiment of the invention.

FIG. 7 is an overhead view of an electrically powered three-point hitch assembly 700 with the top link depicted according to an embodiment of the invention. In this view hidden lines are depicted on the left side but not on the right side to allow a clean view of the apparatus without the hidden elements. Three-point hitch assembly 700 is analogous to three-point hitch assembly 600 with the exception that top link 615 of FIG. 6 is replaced with a top link 715 having a turnbuckle 720 for enabling manual length adjustments to the overall length of the top link. Lower links 707R (R=right) and 707L (L=left) are pinned to lower receiver portions of fixed brackets using steel pins 722R and 722L. Broken lines showing pin 722L extending through the hole are shown and such lines are omitted for 722R. It may be noted herein that the lower receiver portion of a fixed actuator support bracket may have more than one pin hole provided for the purpose of pinning a lower link to the bracket. A pair of fixed actuator support brackets may host the two lower links belonging to a front hitch assembly while simultaneously hosting the two lower links belonging to a middle hitch assembly. Such an arrangement is detailed later in this specification with reference to FIG. 10.

In this view the left side of the hitch assembly 700 includes hidden lines to show hidden features or elements while the right side of three-point hitch 700 does not include the hidden lines for clean presentation purposes. Linear actuators 706L and 706R are pinned to the underside of mobile actuator brackets 701R and 701L using pins 705R and 705L. Lift brackets 712R (not depicted) and 712L are pinned at the lower end of actuator shafts 711R (not depicted) and 711L using steel pins 713R and 713L. In this example, each feature associated with the vertical track of the linear actuators has a concentric relationship with the vertical center line down to pins 713 R and 713 L (both lower link control points).

In the event that three-point hitch assembly 700 is a front hitch assembly, then there may be other fixed brackets and link receivers welded to horizontal frame elements 719 and 720 for supporting the middle three-point hitch assembly, which is a modified version of the front or rear three-point hitch assemblies. Middle hitch modifications are primarily in the offered length of the lower links, which may be shorter in length that the lower links of a front or rear three-point hitch assembly and in the fixed actuator support brackets for supporting the triangular shaped modular actuator brackets that connect to the linear actuators. Hitch assembly 700 is adapted to connect to a wide variety of farm tool implements having the traditional three-points for connection, for example, two lower points at the sides of the implement and one top center point on the fixed mast of the implement bar.

Figure 8:
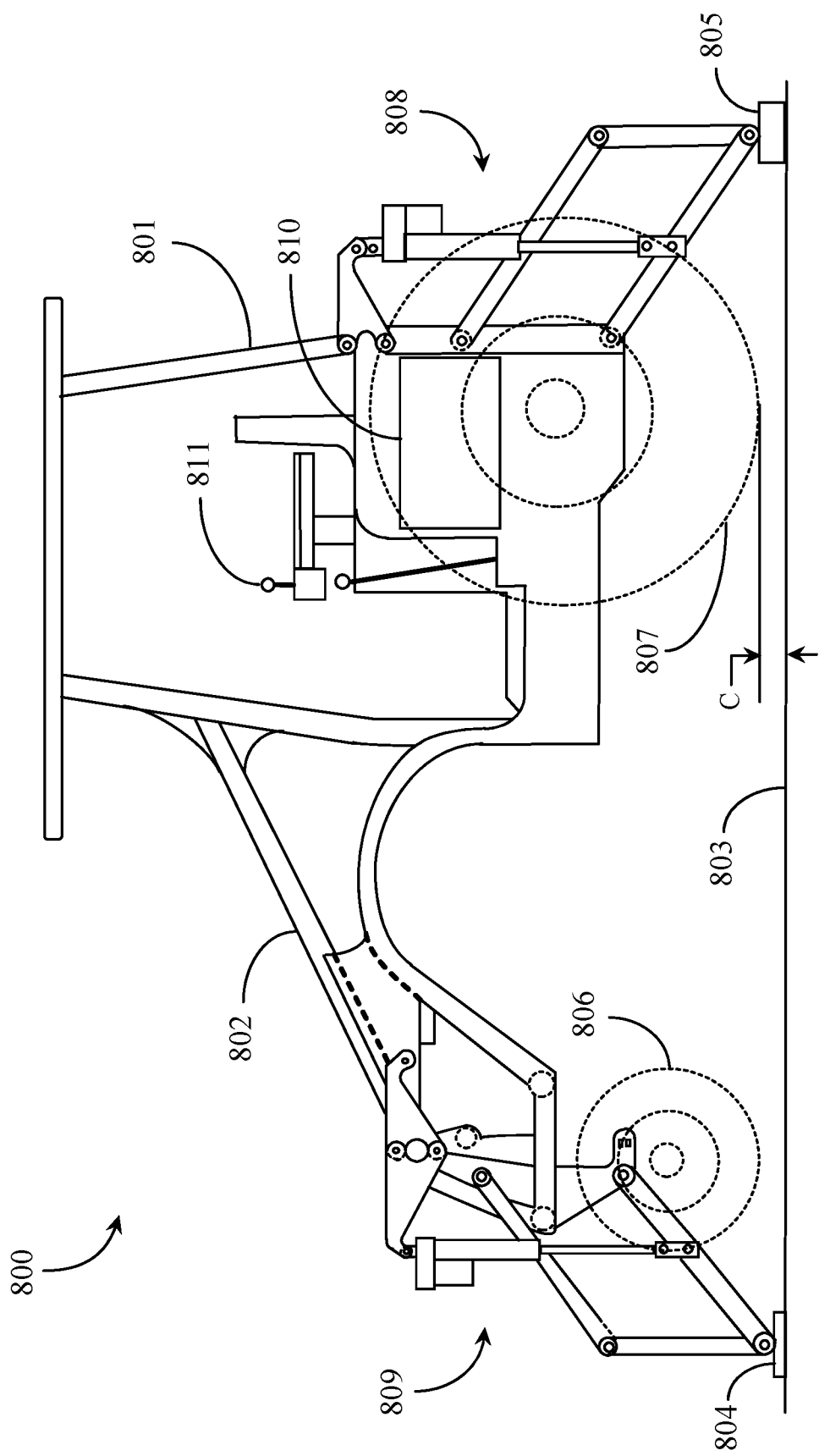
FIG. 8 is a left-side elevation view of a tractor jacked up off of ground utilizing the linear actuator hitch assemblies with lower pin inserted at front and at rear of the tractor.

FIG. 8 is a left-side elevation view of a tractor 800 lifted off of ground utilizing the linear actuator hitch assemblies at front and at rear of the tractor. Tractor 800 may be an all-electric tractor that may be completely assembled from a kit of tractor components including a rear frame section 801 and a front frame section 802. In this view the middle hitch is not depicted however the modular actuator and lower link receiver portion for receiving the middle hitch lower links are illustrated. A tractor operator is also not depicted in this view but may be assumed present.

Tractor 800 includes a front three-point hitch assembly 809 and a rear three point hitch assembly 808. A battery box 810 may be provided as the main on board battery and may be disposed under the seating apparatus in the tractor cab. An all-electric tractor engine is not illustrated but may be assumed present. In this example, an operator may utilize control 811 or another provided electronic interface having control over actuator operation to lift tractor 800 off of ground 803 by extending both front and rear actuators (total four) driving the front and rear lower links downward to ground. In this embodiment, the front and rear hitch assemblies 809 and 808 are connected to horizontal tool bars having fixed center masts for top link pinning.

In one embodiment, lower links of the hitch assemblies may be protected from the ground by pillow blocks or other supports 804 and 805. Such supports may extend in length along the horizontal tool bars pinned to the lower links of each hitch assembly or may be provided at four corners of the footprint. In this embodiment, tractor 800 is jacked (i.e. lifted or elevated) up and off of ground 803 to a height dimension C representing space between mounted tire and ground. Both fixed actuator pins must be inserted in a tractor jack (lift) operation where the tractor is jacked up completely off of the ground.

In one embodiment, an operator may use control 811 to jack up only the front end of tractor 800 by extending actuators in hitch assembly 809, or only the rear end of tractor 800 by extending actuators in hitch assembly 808. Tires 807 (rear) and 806 (front) are referenced herein by hidden line. The actual height that tractor 800 may be elevated off of ground depends on the length capacity of the actuators at full extension. Full extension of the actuators provides maximum height off of the ground.

This feature operable from within the cab of tractor 800 reduces requirements for separate lifting or jack facilities that might otherwise have to be ported with the tractor. Another advantage is an ability to change tires and perform other maintenance tasks requiring the tractor to be lifted off the ground without having to transport the tractor by other vehicle to a maintenance yard or shed or without having to drive the tractor in a state of disrepair to a location where maintenance might be performed. In one use case scenario, an operator may utilize both the front and rear hitch assemblies to get the tractor out of a rut or a ditch or unstuck from mud by lifting the tractor up and placing a better medium or false road way to lower the tractor back down on.

Figure 9A:
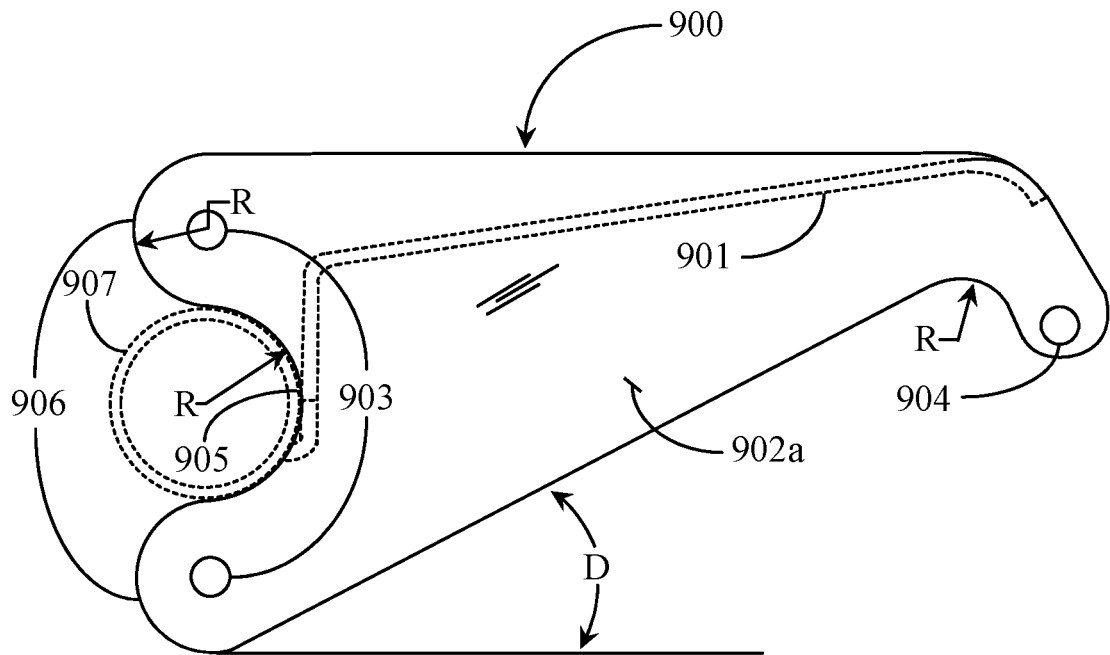
FIG. 9A is a right-side view of a modular actuator connection bracket of one of the linear actuator hitch assemblies of FIG. 1.

FIG. 9A is a right-side view of a modular actuator bracket 900 of one of the linear actuator hitch assemblies of FIG. 1 and further depicts bracket 202 shown in FIGS. 2-4 FIG. 9B is an underside view of modular actuator bracket 900 of FIG. 9A. Referring now to FIG. 9A, Modular actuator bracket 900 may be fabricated of steel one quarter inch plates and a steel spacer bar to hold the plates apart parallel and in true alignment. Bracket 900 includes a first actuator bracket plate 902*a* and a second actuator bracket plate 902*b* (not visible). Bracket plates 902*a* and 902*b* are spaced apart by a formed spacer bar 901. Actuator plates 902*a* and 902*b* are triangular in profile and include three pin holes. Pin holes 903 placed through both actuator plates each receive a steel pin or bolt that connects the base end of the triangular bracket to a fixed actuator support bracket welded to horizontal frame members. The top pin hole 903 defines the space where the upper pin 208 is shown in FIG. 2. The bottom pin hole 903 defines the space where the lower pin 209 is shown in FIG. 2. Actuator bracket 900 is a modular bracket that may be unpinned from the fixed actuator support bracket.

Figure 9B:
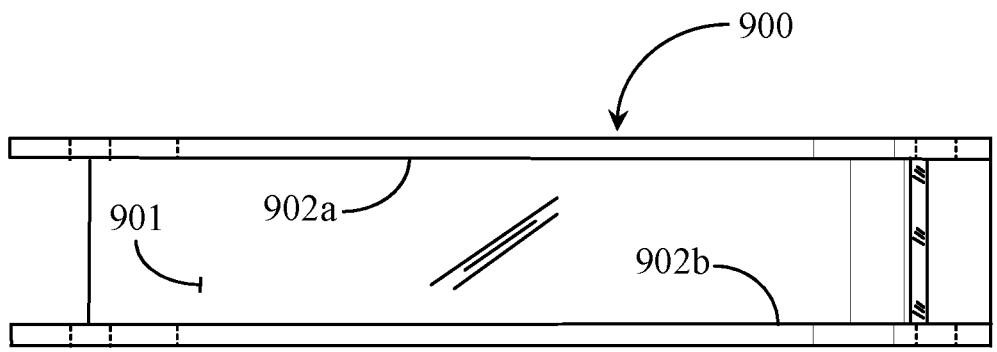
FIG. 9B is an underside view of the modular actuator connection bracket of FIG. 9A.

Referring now to FIG. 9B, actuator bracket 900 as viewed herein from the underside, depicts both plates 902*a* and 902*b* held parallel and in true feature alignment relative to pin hole alignment, radius alignment, and edge alignment. Referring now back to FIG. 9A, the overall length of actuator bracket 900 may vary according to application; however a nominal size may be ten to twelve inches long. Width of actuator bracket 900 may nominally be about four inches at the widest point.

Actuator bracket plates 902*a* and 902*b* have a material relief radius feature 905 having a radius R, wherein the center point of R lies on a vertical center line shared by pin hole features 903 disposed midway between pin holes. R may be approximately 35 millimeters or just over an inch radius. A reference frame member 907 may be approximately two inches in diameter. Pin hole 903 may be approximately 14 millimeters in diameter. Material relief feature 905 is bounded by radial plate features generally concentric with the pinhole features 903. Radius R beginning at center of pin hole feature 903 to the edge of the radial feature may nominally be about 25 millimeters or just over three-quarter inch. Material relief and radial shaping of the plate ends of actuator bracket 900 enables nesting the modular bracket to the fixed actuator support bracket welded to the horizontal frame member referenced herein by frame member 907 and then pinning modular bracket 900 in place.

Actuator plates 902*a* and 902*b* have a bottom edge that angles 32 degrees (represented by angle D) or there about from horizontal. The bracket end opposite of pin hole features 903 include pin hole feature 904 enabling the small end of the bracket to be pinned to a linear actuator as depicted further above with respect to FIG. 2-5 (element 210) and FIG. 7 (705R and 705L). Radius R at the small end of the bracket may be approximately 13 mm or just over three eights of an inch. This radius cut out and the angled bottom edge provide material relief for use in a float mode operation where actuator bracket 900 may be separated from the fixed actuator support bracket (element 201 on FIGS. 2-5) by removing the lower pin (element 209 on FIGS. 2-5).

In one embodiment, spacer plate 901 is formed to provide support at the linear actuator connection end at the top and then angled down generally away from the top edge of bracket 900 before bending downward and terminating just inside the large radius feature 905. The actuator plates and spacer bar of bracket 900 may be assembled in a jig fixture and welded to form bracket 900.

FIG. 10A is a left-side view of a fixed actuator support bracket 1000 for the front and middle three-point hitch assemblies according to an embodiment of the invention. FIG. 10B is a rear end view of fixed actuator support bracket 1000 of FIG. 10A. Referring now to FIG. 10A, fixed actuator support bracket 1000 comprises a pair of fixed actuator plates 1002*b* and 1002*a* (not visible) that are spaced apart and held substantially parallel and in true alignment with respect to cut features and pin holes by a spacer bar 1001.

In this example, fixed actuator support bracket 1000 has one or more features that are not specifically illustrated in FIGS. 2 through 5 referring to fixed actuator support bracket 201. For example, the large radii cutout features enable tube frame installation and an extra pin hole at the bottom of the bracket enables mid hitch lower link connection. Such features are described in more detail below. Bracket 1000 is an elongate bracket oriented vertically and welded in pairs to horizontal and, in this case, tubular frame members referenced herein as an upper and lower frame member given the same element number 1007.

In this view, fixed actuator support bracket 1000 is viewed from the left side of a tractor in correct vertical orientation and the forward side of the frame members 1007 to which the bracket is welded or otherwise affixed to face the front of the tractor and the front hitch assembly. Referring now to FIG. 10B, bracket plates 1002*a* and 1002*b* may be three eights inch steel plates held apart in parallel formation and in true feature alignment by spacer bar 1001. Spacer bars used to separate the bracket plates and reinforce the bracket may be one eights of an inch in plate thickness or more.

Referring now back to FIG. 10A, the overall length of fixed actuator support bracket 1000 may nominally be around 26 inches long to 28 inches long or so. Support bracket 1000 includes an upper end or portion including a pin interface arrangement that matches that of modular actuator connection bracket 900. Included are pin holes 1003 that align with pin holes 903 on modular bracket 900. The forward edge of support bracket 1000 lending to the upper portion of the bracket is angled to approximately 24 degrees from vertical representing the angle of offset between the upper and lower tubular frame members 1007 supporting the bracket. Support bracket 1000 includes a third 14 millimeter pin hole 1004 in the upper section through both plates 1002*b* and 1002*a*. Pin hole 1004 may be for storing a spare steel pin or to store a lower pin removed from the nested assembly including both brackets.

Radiused cut out 1005 matches the counterpart radius cut out 905 on bracket 900 just over 1 inch radius R. Bracket 1000 includes a middle section generally defined at an apex of edge presenting angle E (approximately 24 degrees from vertical) and an edge presenting angle F (approximately 22 degrees from vertical) leading down to a lower bracket section. The bracket plates share a cut out feature having the same radius R as feature 1005 for clearance to weld support bracket 1000 to the lower tubular frame member 1007. The lower end or portion of support bracket 1000 includes two 23 mm diameter pin holes 1008. The forward pin hole 1008 is reserved for receiving the rear end of a lower link of the front three-point hitch assembly.

The rearward pin hole 1008 is reserved for receiving the rear end of a lower link of the middle three-point hitch assembly. In this example, spacer bar 1001 may be a steel bar one eight or more thickness that may reinforce bracket 1000 from the upper portion adjacent to radius 1005 angling downward generally parallel to the forward edge 1010 presenting at angle E but well within the interior of the bracket to the lower matching radius R (at lower member weld location), and then downward toward the lower portion generally parallel to the lower forward edge 1011 presenting angle F and terminating just above and behind the forward most of the lower link receiver pin holes 1008. A rearward vertical edge 1012 of bracket 1000 extends upward from the lower receiver portion of the bracket to a mid-upper region where the bracket narrows in width as depicted herein by directional arrow 1013. The widest point of support bracket 1000 is nominally between seven and eight inches in width measured from the rearward vertical edge 1012 to either leading point at the vertices of angles E and F at the middle section hosting the lower frame member welding location.

Figures 11A, 11B:
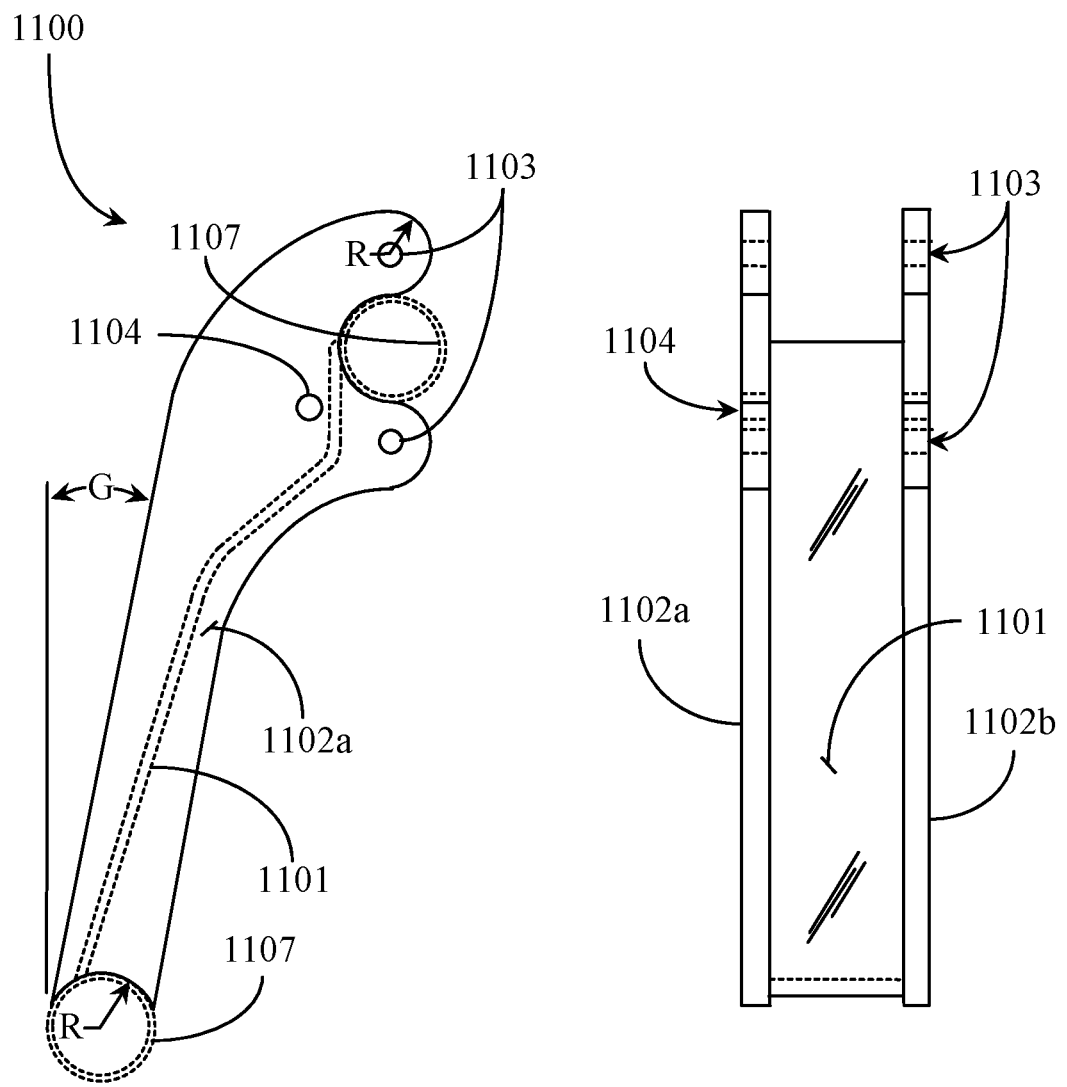
FIG. 11A is right-side view of a fixed mid-hitch actuator support bracket of the linear actuator mid-hitch assembly 110 of FIG. 1.
FIG. 11B is a front elevation view of the fixed mid-hitch actuator support bracket of FIG. 11A.

Referring now to FIG. 11B, spacer bar 1101 separates plates 1102*a* and 1102*b* to create a gap or inside to inside dimension just large enough to accept the modular actuator for pining, the modular actuator being smaller in overall width for nesting purposes.

Referring now back to FIG. 11A, fixed actuator support bracket 1100 is vertically oriented and welded to the upper and lower tubular support members 1107. Fixed support bracket 1100 is nominally about 16 inches in length and includes a lower end that includes a radius material relief cut-out R of approximately an inch for matching radius of lower tubular frame member 1107.

Fixed support bracket 1100 for the middle three-point hitch assembly does not require lower link receivers as they are hosted on the fixed actuator support brackets supporting the front hitch assembly. It is welded to lower frame member 1107 and is angled (G) at generally a straight width before widening to form the upper section that interfaces with the modular actuator connection bracket. It is noted herein that the modular actuator connection bracket may be of the same architecture and design including feature dimension so as to be interchangeable for use with the front three-point hitch assembly, the rear three-point hitch assembly, or the middle three-point hitch assembly.

In this example, spacer bar 1101 begins at the lower radiused end and angles toward the upper section where the bracket widens, then angles forward generally along the radiused forward edge of the bracket before angling vertically upward to terminate adjacent to the upper material relief cut out midway between pin holes 1103. A pin hole 1104 maybe a spare pin hole or general pin storage hole. Like bracket 1000 of 10A, the upper pin interface of bracket 1100 includes radiused ends concentric around upper and lower pin holes 1103 of the fixed support bracket 1100 with R of just more than three quarter of an inch (25 mm or so).

In case of fixed brackets having spacer bars 1001 (bracket 1000, FIG. 10A) and 1101 (bracket 1101, FIG. 11A), the spacer bars may make contact at the steel tubular frame members to provide lateral weld surfaces in addition to the radiused plate edges taking vertical welds. There may be two vertical welds and a cross weld at each weld location. The approximate angle G of presentation of the lower portion of bracket 1101 is nominally 11 degrees from vertical. It is noted herein that material relief features such as radius cuts and angle cuts are provided by design in both the fixed support brackets and in the modular connection brackets described herein to mitigate function of the bracket connections relative to pivoting, nesting, and articulating without binding or becoming an obstacle to a moving part of a hitch assembly or other tractor parts such as tires, drive train, steering rods, and so on. Middle hitch components such as the lower links may be modified with cross bar to enable lifting and lowering using one linear actuator instead of two as at the front and rear assemblies. However, it may be noted that a middle hitch may be provided having two linear actuators like the front and rear hitch assemblies requiring two actuator bracket connections that may be spaced within the confines of the front actuator bracket connections relative to the upper and lower frame members they are mounted to.

One with skill in the art of three-point hitch architecture will appreciate that dedicating a fixed actuator bracket to service both front and middle hitch links and offsetting middle hitch fixed actuator brackets with respect to weld locations on a same set of frame members provides for a slightly more compact middle hitch assembly that may be operated within a footprint that does not obstruct tractor functions such as steering or the like.

FIG. 12A is a left-side view of a fixed middle hitch actuator support bracket 1200 modified to include top link receiver openings for the top link of the front hitch and the top link of the mid hitch according to an embodiment of the invention. FIG. 12B is a front-end view of fixed middle hitch actuator support bracket of FIG. 12A. Referring now to FIG. 12A, a middle hitch actuator support bracket 1200 is provided that is dedicated to servicing both the front three-point hitch assembly and the middle three-point hitch assembly relative to top link receiver pin holes 1206.

Fixed support bracket 1200 comprises two bracket plates 1202*a* and 1202B of approximately one quarter of an inch-thick steel plate held apart in parallel and in true alignment relative to pinhole and radius features by a spacer bar 1201 of one eight of an inch or more steel plate. Fixed actuator support bracket 1200 includes a lower portion having a radiused material relief cut out for weld clearance at the lower frame member referenced herein as the lower member of upper and lower frame members 1205.

Spacer bar 1201 begins at the lower rear side of fixed actuator support bracket 1200 and may come in lateral contact with the tubular frame member 1205 having a radius just over one inch for welding to a two-inch diameter tube. Support bracket 1200 is widest at the lower end approximately seven inches or so in width. The lower section of support bracket 1200 is triangular with a rear edge sloping forward at angle H approximately 45 degrees from vertical. The forward edge (direction of mid hitch assembly and actuator) of the lower end of support bracket 1200 is largely vertical. The lower section gives way to a triangular middle section of support bracket 1200 wherein pin holes 1206 are provided through plates 1202*a* and 1202*b*.

Spacer bar 1201 begins at the lower rearward corner of support bracket 1200 and angles forward until between top link pin holes 1206 before angling back toward the middle of the upper bracket interfacing portion terminating adjacent to the upper tubular frame member 1205.

Pin holes 1206 are adapted for receiving the top link of the front hitch assembly at the rearward pin hole 1206 and the top link of the middle hitch assembly at the forward pin hole 1206. Pin holes 1206 may nominally be approximately 20 millimeters in diameter or between one half inch and three-quarter inch in diameter. Referring now to FIG. 12B, bracket plates 1202a and 1202b are held apart parallel to form a gap or inside-to inside dimension between plates that is just wider than the outside-to outside width of the modular actuator for nesting purposes.

Referring now back to FIG. 12A, the middle section or portion hosting pin holes 1206 includes a front bracket edge that presents a back angle I that may be 23 degrees from vertical. A rear edge of the middle section of support bracket 1200 above pin holes 1206 rises vertically to the beginning of the upper section or top interfacing end of the bracket hosting pin holes 1203 and a spare pin hole 1204 that might be provided to store a spare pin. The top or upper section includes the upper welding location 1205 just over a one-inch radius facilitating weld over a two-inch diameter tubular frame member.

In this example, the fixed actuator support brackets such as brackets 1000 for the front hitch assembly and the fixed actuator support bracket such as bracket 1100 shown in FIGS. 11A and 11B (no top link support) or bracket 1200 (with top link support) are oriented to face opposite one another welded to the same lateral frame members. The lower links for both middle and front hitch assemblies may be pinned to fixed actuator support bracket 1100 (See FIGS. 11A and 11B) while the top links for both middle and front hitch assemblies may be pinned to fixed actuator support bracket 1200. In another embodiment, a top link bracket can be provided adjacent on the weld frame to an actuator bracket such as bracket 1100 having no top link receiver holes.

It is noted herein that the rear hitch assembly may be a mirror image of the front hitch assembly having all of the same components. In one embodiment, a rear hitch may be mounted at a different elevation on the tractor than the front hitch and middle hitch without departing from the spirit and scope of the present invention.

Figure 13:
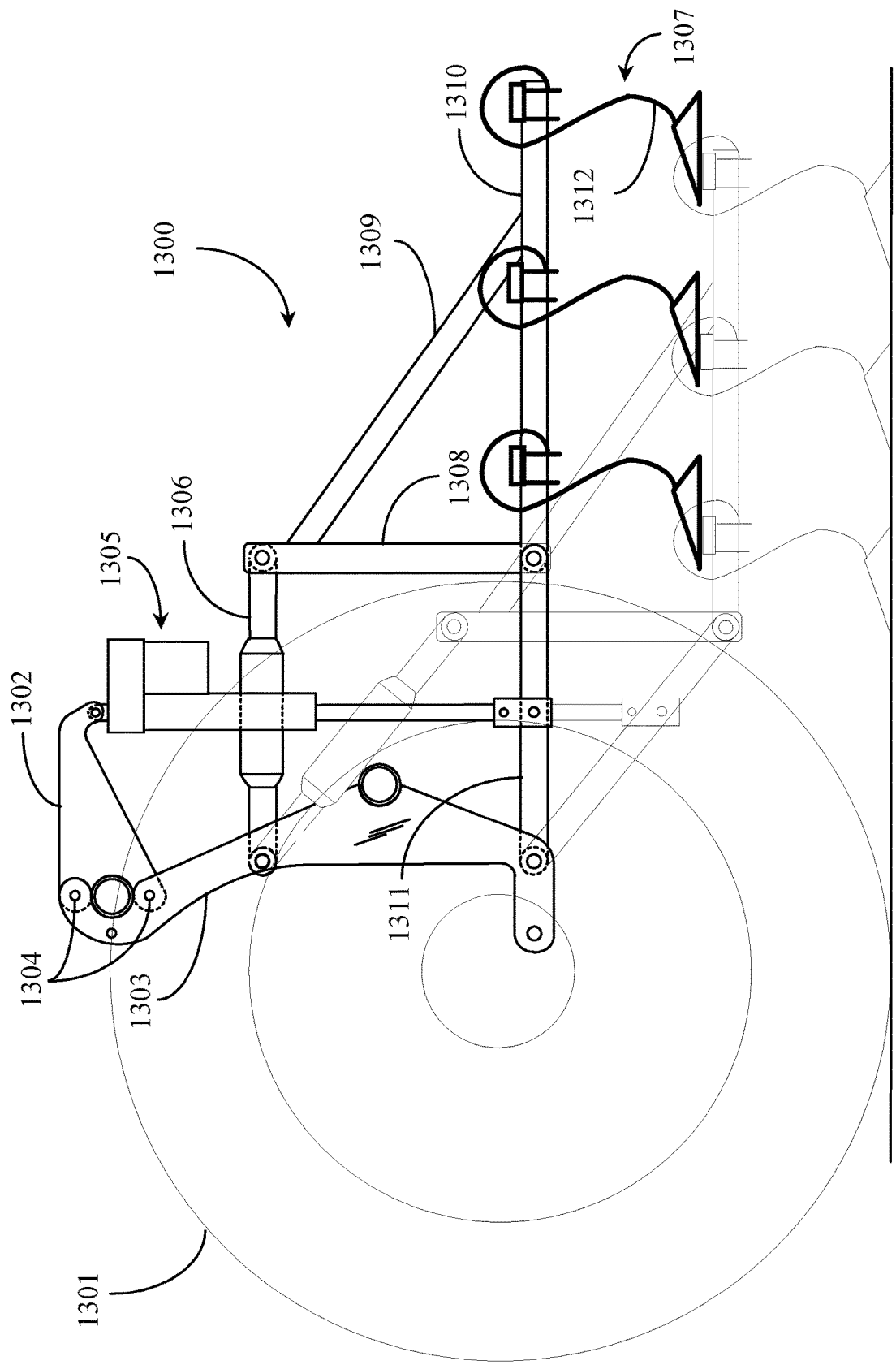
FIG. 13 is a left-side elevation view of a linear actuator rear-hitch assembly with a leveling top link for maintaining a state of level with respect to a connected tooled agricultural work implement according to an embodiment of the invention.

FIG. 13 is a left-side elevation view of a linear actuator rear-hitch assembly 1300 with a leveling top link for maintaining a state of level with respect to a connected tooled agricultural work implement according to an embodiment of the invention. Rear hitch assembly 1300 is a three-point hitch assembly that like the front and mid-hitch assemblies is powered by a pair of all-electric linear actuators 1305 that have the capability of exerting force bidirectionally along the linear track to raise and to lower a pair of lower links 1311 connected at one end to a fixed actuator support bracket 1303 and at the other end to a farm tool implement 1307. In this view, there are two positions taken by the rear three-point hitch assembly 1300. One position is a middle lift position where farm-tool implement 1307 is lifted off of ground. Element numbers are provided to the elements of this position. The second position in this view is depicted in lighter solid lines and shows the same assembly 1300 lowered to ground level. The components illustrated in lighter point line shall be assumed to have the same element numbers attributed in the first view using heavier point lines.

Fixed actuator support bracket 1303 may be used for either a rear hitch assembly or a front hitch assembly without departing from the spirit and scope of the invention. For example, bracket 1303 includes a lower receiver for accepting a lower link from a middle hitch assembly. In one embodiment, the lower end of bracket 1303 only contains one receiver opening for receiving the lower link end of the lower links 1311 of which two are provided. Linear actuators 1305 are pivotally pined to each lower link 1311 at the end of the extension/retraction shaft of the actuator with the help of a link control bracket adapted to accept a steel pin through the bracket plates and the lower links.

The forward ends of lower links 1311 are pivotally connected to a farm tool implement 1307 at a cross bar member (not visible) supporting a vertically-extending center mast 1308 having at least one structural support bar 1309 welded to the mast and to the implement mounting bar 1310. In this case, farm-tool implement 1307 includes a number of cultivator tines or spades 1312 welded along the implement tool bar and adapted for making contact with and working the ground.

Fixed actuator support bracket 1303 is oriented vertically and welded to horizontal frame members depicted as tubular members in this example. Fixed actuator bracket is nested to a modular actuator connection bracket 1302 and pinned thereto using pins 1304. Actuator connection bracket 1302 has a pivotal connection at the base end of the linear actuator 1305. There are two fixed actuator support brackets, two modular actuator connection brackets and two linear actuators for lifting and lowering links 1311.

A top link bracket (not depicted) may be provided and welded to the horizontal frame members supporting the fixed actuator support bracket at a location at or near center of the three-dimensional architecture of the hitch, more particularly at a spot on the frame members between the fixed actuator support brackets of which there are two. Top link 1306 is pivotally connected at the opposite end to the top end of vertical mast 1308 that is also located more toward the center of the implement cross bar (not depicted). Therefore, the lower two pivotal mounting points are at the ends of the cross bar and the third point is the top of the fixed mast and is also a pivotal connection.

Leveling farm tool implement 1307 may first be accomplished at ground level after lower links 1311 are connected. Top link 1306 is length adjustable using a turnbuckle device to lengthen or shorten the link. In this example, top link may be adjusted in length to attach the link to center mast 1308 while the farm tool implement is in a level state on the ground. This may be due to the blade or tine implements being oriented correctly and angled correctly in some embodiments to which the presentation may be considered level.

Once the top link 1306 is adjusted to correct length and is connected to the vertical center mast 1308 of the farm tool implement 1307, the farm tool implement will remain level while it is lifted and while it is lowered back down to ground level. In this embodiment, a second ground level positioning is depicted in which implement bar 1307 is resting with the blades or tines touching ground and the position is considered level by the operator or in other words, at a desired angle of presentation to the ground which might vary depending upon the nature of an implement.

In this case, level is considered the position where all blades are touching the ground. When the operator lifts the implement bar from the ground, the correct length adjustment made to top link 1306 and its mounting location on mast 1308 keeps the top link parallel to the lower links such that when the hitch articulates a parallelogram is maintained in motion relative to lower links 1311 and top link 1306. The rear mounting point of the top link may share the same vertical center plane as the rear mounting points of the lower links and length adjustment may be made to the top link by turning the turnbuckle clockwise or counter clockwise. As long as this adjustment is made when the top link is attached to the center mast while the farm tool implement is level, the farm tool implement will stay in a level state as it is lifted and as it is again lowered.

An operator may make purposeful adjustments to the length of the top link to effect different angles of presentation for an implement working the ground wherein the set angle of presentation does not change when lifting or lowering the implement. In a further embodiment, the length adjustments of the top link 1306 may be made remotely if the top link is replaced by a linear actuator having a scale device for measuring travel along the linear track. For example, a user may pin a farm tool implement to the lower links where the implement is level on the ground and then may connect the top link using a manual length adjustment if the link is out of proper length (too short or too long) and cannot be pinned.

Once pinned, the top link must remain parallel in relationship to the lower links in order to maintain the same ground level presentation or to maintain the desired presentation angle of the farm tool implement relative to ground level when the hitch is lifting the farm tool implement and lowering the farm tool implement. In one embodiment, an operator may make a series of length adjustment to top link 1306 while the farm tool implement is connected in order to purposely change the angle of presentation of the tool and to change it back again. For example, a tool designed to cut a row behind a tractor may be designed to break the ground best at a specific angle and may be pulled at that angle to cut a specific depth of a planting row for example according to the set angle of presentation accomplished first when the tool was connected at ground level. That same tool leveled may not break ground. After a first pass at a first angle of presentation, the operator may want to make a second pass with the angle of presentation increased or decreased to change the depth of the row being dug. The operator may use a control lever, slider, or button set to make an adjustment to the top link actuator in order to pull (shorten top link length) the center mast out of perpendicular increasing angle of blade points to ground, or to push the center mast out of perpendicular away (lengthen top link) to decrease the angle of presentation of blade points to ground.

In one embodiment, settings for achieving proper angles of presentation for specified farm-tool implements connected to the hitch links may be entered onto a memory card that may be read at a hitch control panel. An automated routine adapted to make adjustment to the length of the top link can be executed by the operator to automatically read and then execute the proper length of the top link required to set the desired pitch angle for the implement. This requires knowledge of the dimensions of the farm tool implement and the resting angle of the implement when it is on ground. After first lift the routine may be executed once to pivot the farm tool implement to the desired angle (typically off horizontal base line).

In one embodiment, the tractor may use any of the hitch assemblies to connect to and lift a battery box implement such as battery boxes 113*a*-*c* of FIG. 1 for example. A hitched battery that requires charge may be lowered onto a roller platform and may be unpinned to the box and electrical connections to that battery may be unplugged. The depleted battery may then be transported to a charge station and a fresh battery may be rolled up to the hitch. An operator may then connect the pins to the three-point locations on the battery box, plug in the harnessed plugs or connectors, and then hoist the battery to perhaps middle level, and carry it while it is being used to power other tractor functions. The unique aspect of the linear actuators exerting force downward as well as upward enables a wider variety of implements to be used by a three-point hitch powered by at least one bidirectional linear actuator.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A tractor comprising:
an electric dive motor mounted on one of two or more tractor frame sections, the electric motor adapted to power a drive train to drive the tractor;
at least one rechargeable electric power source mounted to or at least ported by one of the at least two or more tractor frame sections, the electric power source having a wire connection to the electric drive motor for supplying power to the motor to drive the tractor via the drive train;
at least one electric powered three-point hitch assembly having two elongate lower link bars and an elongate top link bar mounted to one of the two or more frame sections and having mechanical couplings at the end points of the link bars to connect to a farm tool implement;
at least one electrically operated linear actuator capable of exerting bidirectional travel defined by extension and retraction capability along a linear track pivotally connected at one end to at least one of the lower link bars and pivotally connected at the opposite end to a modular bracket pinned to a fixed bracket welded to or otherwise fixed to the frame, the linear actuator having a gear set to drive a screw and an electric motor connected by wiring to the at least one rechargeable power source and to an electric control box or panel having one or more controls operable by a user seated in a cab section of the tractor to raise and lower the three-point hitch assembly and attached farm tool implement.

2. A three-point hitch comprising:
a pair of lower link bars pivotally connected at a same end to a first pair of fixed actuator brackets, the brackets oriented in a same direction and spaced apart and welded to or otherwise fixed to a frame element of a host vehicle;
a top link bar disposed centrally between the lower link bars, the top link bar pivotally connected at one end to a single fixed top link receiving bracket, the top link receiving bracket welded to or otherwise fixed to the frame element of the host vehicle at an elevated position on the frame element above and substantially in between the pair of fixed actuator brackets;
at least one modular actuator bracket having a pin connection interface for pinning to a like interface provided on at least one of the fixed actuator brackets, the at least one modular actuator bracket pinned at the opposite end from the fixed actuator bracket to an electrically operated linear actuator capable of exerting bidirectional travel defined by extension and retraction capability along a linear track, the at least one linear actuator pivotally connected at the opposite end from the modular actuator bracket to one of the lower link bars, or to a cross bar connecting the pair of lower link bars, the linear actuator having a gear set to drive a screw and an electric motor connected by wiring to the at least one rechargeable power source and to an electric control box or panel having one or more controls operable by a user seated in a cab section of the host vehicle to raise and lower the three-point hitch assembly having mechanical coupling at the end points of the link bars to a farm tool implement.

* * * * *